US007922334B2

(12) United States Patent
Zheng et al.

(10) Patent No.: US 7,922,334 B2
(45) Date of Patent: Apr. 12, 2011

(54) MULTISTAGE COOLING SYSTEM FOR PROJECTOR

(75) Inventors: Wanjun Zheng, Shenzhen (CN);
Yanyun Yan, Shenzhen (CN);
Xiangdong Liang, Shenzhen (CN);
Xiangfei Kong, Shenzhen (CN); Yun Wang, Shenzhen (CN); Xiaoling Mao, Shenzhen (CN); Yi Guan, Shenzhen (CN); Yanshan Huang, Shenzhen (CN);
Toshihiro Saruwatari, Osaka (JP);
Shoji Okazaki, Osaka (JP); Tadashi Renbutsu, Hyogo (JP)

(73) Assignees: Sanyo Electric Co., Ltd., Moriguchi (JP); Sanyo Technology Center (Shenzhen) Co., Ltd., Shenzhen (CN)

( * ) Notice: Subject to any disclaimer, the term of this patent is extended or adjusted under 35 U.S.C. 154(b) by 422 days.

(21) Appl. No.: 12/062,877

(22) Filed: Apr. 4, 2008

(65) Prior Publication Data
US 2008/0252857 A1 Oct. 16, 2008

(30) Foreign Application Priority Data

Apr. 5, 2007 (CN) .......................... 2007 1 0100527

(51) Int. Cl.
*G03B 21/18* (2006.01)
*G03B 21/26* (2006.01)
(52) U.S. Cl. ............ 353/58; 353/85; 353/121; 396/571; 315/117; 315/118

(58) Field of Classification Search .................... 353/58, 353/85, 121, 119; 396/571; 315/117, 118
See application file for complete search history.

(56) References Cited

U.S. PATENT DOCUMENTS
7,052,143 B2 * 5/2006 Russell et al. .................. 353/58

FOREIGN PATENT DOCUMENTS
CN 1928707 A 3/2007
JP 2006-98734 A 4/2006

OTHER PUBLICATIONS
Chinese Office Action dated Jul. 24, 2009, issued in corresponding Chinese Patent Application No. 200710100527.

* cited by examiner

*Primary Examiner* — Seung C Sohn
(74) *Attorney, Agent, or Firm* — Westerman, Hattori, Daniels & Adrian, LLP

(57) ABSTRACT

A projector having optical components, a power source unit, and a light source unit. The projector is capable of lowering its internal temperature utilizing: a first, second, and third fan (41, 42, 43) provided near the optical components for introducing external air from outside the projector to cool the optical components; and a fourth, fifth, and sixth exhaust fan (16, 17, 18). The fourth fan (16) blows the air that was taken in by the first, second, and third fan (41, 42, 43) and has cooled the optical components, onto the light source unit to further cool the light source unit. The fifth and sixth exhaust fans (17, 18) discharge the air that has cooled the light source unit and power supply unit out of the projector.

9 Claims, 19 Drawing Sheets

MULTISTAGE COOLING SYSTEM FOR PROJECTOR

FIELD OF THE INVENTION

This invention relates to a projector capable of properly lowering its internal temperature.

BACKGROUND OF THE INVENTION

With recent rapid development of projector technology, major market interest is directed to the research and development of a high-performance compact projector that is operable at a low temperature.

General purpose liquid crystal projectors available in the market have four intake fans installed near the liquid crystal panels (hereinafter referred to as LCPs), along with two exhaust fans each discharging an amount air three times as much as the intake air sucked in by each intake fan. In such arrangement, it is difficult to design a liquid crystal projector not affected by hot air lingering in the projector.

Therefore, there is a need in the market for a compact projector having high-luminosity, equipped with a minimum number of fans, and yet having a low fan noise level, and satisfactory temperature compatibility.

SUMMARY OF THE INVENTION

In view of the above-mentioned circumstances, the present invention is directed to a liquid crystal projector capable of efficiently lowering the temperature inside the projector that has optical components, a power unit, and a light source unit.

In accordance with one aspect of the invention, there is provided a projector having: at least a light source unit; optical components adapted to decompose a beam of source light from the light source unit into beams of three primary colors (red, green, and blue), modulate the three colored beams based on an image signal received, compose the three modulated beams into a beam of full-color imaging light, and project the imaging light; and a power supply unit for supplying electric power to the light source unit and optical components, the projector comprising:

a first, second, and third fan (41-43) each provided near the optical components to introduce external air from outside the projector to cool the optical components; and a fourth, fifth, and sixth fan (16-18) for discharging internal air of the projector, with the fourth fan (16) adapted to cool the light source unit by blowing into the light source unit the air that has been introduced by the first, second, and third fan (41, 42, 43) and has cooled the optical components, and the fifth and sixth fans (17, 18) adapted to discharge out of the projector the air that has cooled the light source unit and the power supply unit.

In this arrangement, the number of fans for cooling the optical components can be reduced to three, so that the total number of fans installed in the projector can be reduced to six. At the same time, air flows inside the projector are improved in that the temperatures of the optical components near the respective LCPs and the casing of the projector are lowered. Thus, this arrangement is advantageous for a high-performance projector.

The first through fourth fans can be centrifugal fans.

These fans can suck in external air and blow off the air to predetermined interior sections of the projector that must be cooled.

On the other hand, the fifth and sixth fans (17, 18) are preferably axial fans.

These fans can powerfully exhaust the projector.

Moreover, the first and third fans (41, 43) are preferably arranged on one side of the optical components for composing the three color imaging light, while the second fan (42) is preferably arranged on the other side of the optical components to face the first and third fans (41, 43) across the optical components.

This arrangement ensures efficient performance of the fans in the projector.

The fifth and sixth fans (17, 18) are preferably arranged on one side of the projector and behind the light source. The fourth fan (16) is preferably arranged near, and on the other side of, the light source unit to face the fifth and sixth fans (17, 18) across the light source unit.

This arrangement permits efficiently discharging, out of the projector, the air that is fanned by the fifth and sixth fans to the light source unit by the fourth fan (16) to cool the light source unit.

In this case, the amount of the air to be discharged by the fifth and sixth fans (17, 18) is preferably at least 3 times as much as the amount of the air taken in by the first, second, and third fans (41, 42, 43).

Thus, the air that is externally introduced into the projector to cool the interior thereof can be efficiently discharged out of the projector.

Preferably, the fifth fan (17) primarily discharges the air that has cooled the light source unit, while the sixth fan (18) primarily discharges the air that has cooled the power supply unit.

Thus, the internal air of the projector can be efficiently discharged.

Preferably, the fifth and sixth fans (17, 18) are obliquely aligned to each other so that the air streams expired from these fans cross each other.

This arrangement can mix the two streams of air into an air stream having a lower average temperature as they are discharged from the projector.

The projector may be further provided, between the second fan (42) and the fourth fan (16) and near the fourth fan (16), with a rectifying plate (500) for guiding air flow.

Thus, although the second and fourth fans are separated from each other at a short distance, they do not interfere with each other and perform normal operation, that is, the air expired from the second fan and has cooled predetermined sections of the projector is inspired by the fourth fan to cool the light source unit.

DETAILED DESCRIPTION OF THE PREFERRED EMBODIMENTS

Figure 1:
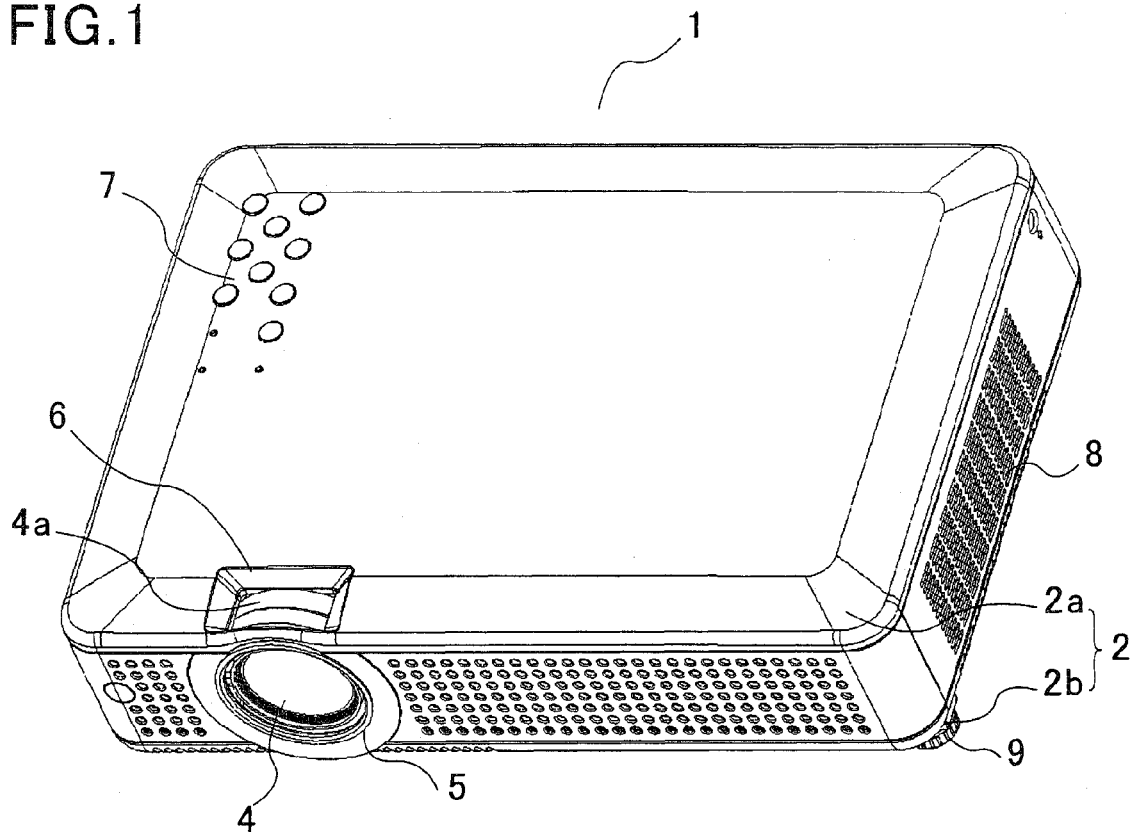
FIG. 1 is a perspective view of a projection type image display apparatus in the form of a liquid crystal projector in accordance with one embodiment of the invention, as viewed from an upper oblique position with respect to the front end of the projector.
Figure 2:
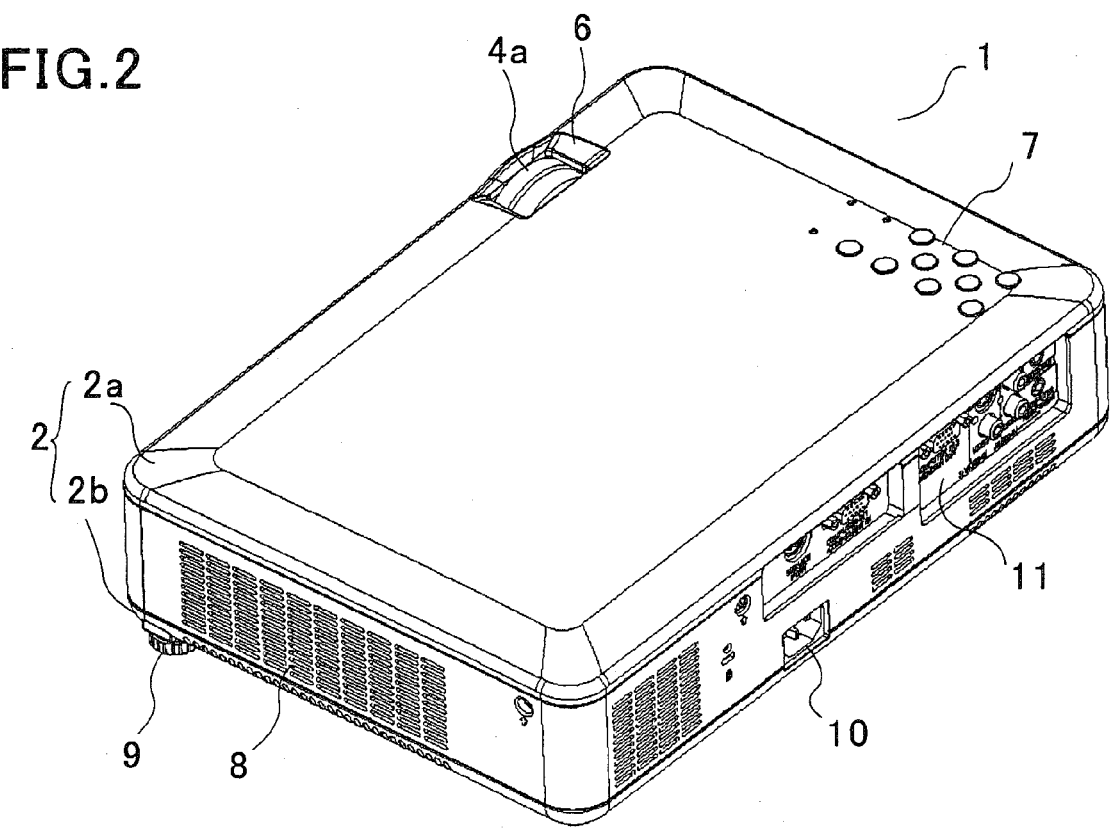
FIG. 2 is a perspective view of the liquid crystal projector as seen from an upper oblique position with respect to the rear end of the projector.
Figure 3:
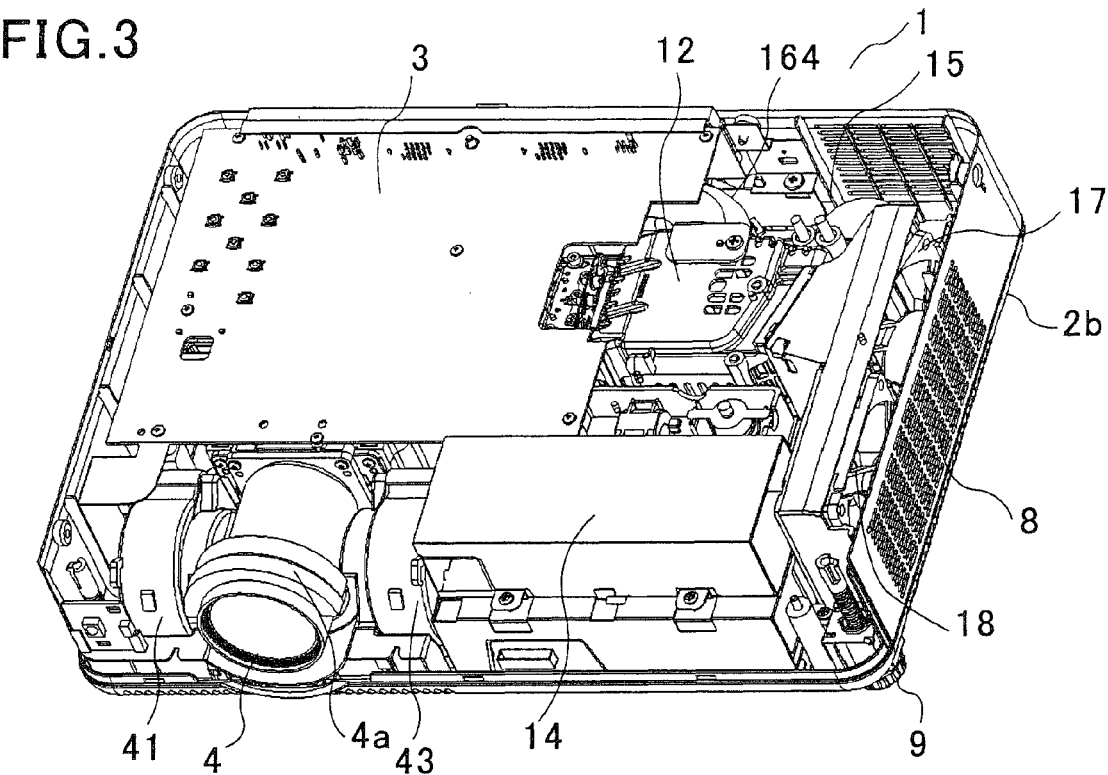
FIG. 3 is a perspective view of the projector, with its upper cover shown in FIG. 1 removed.
Figure 4:
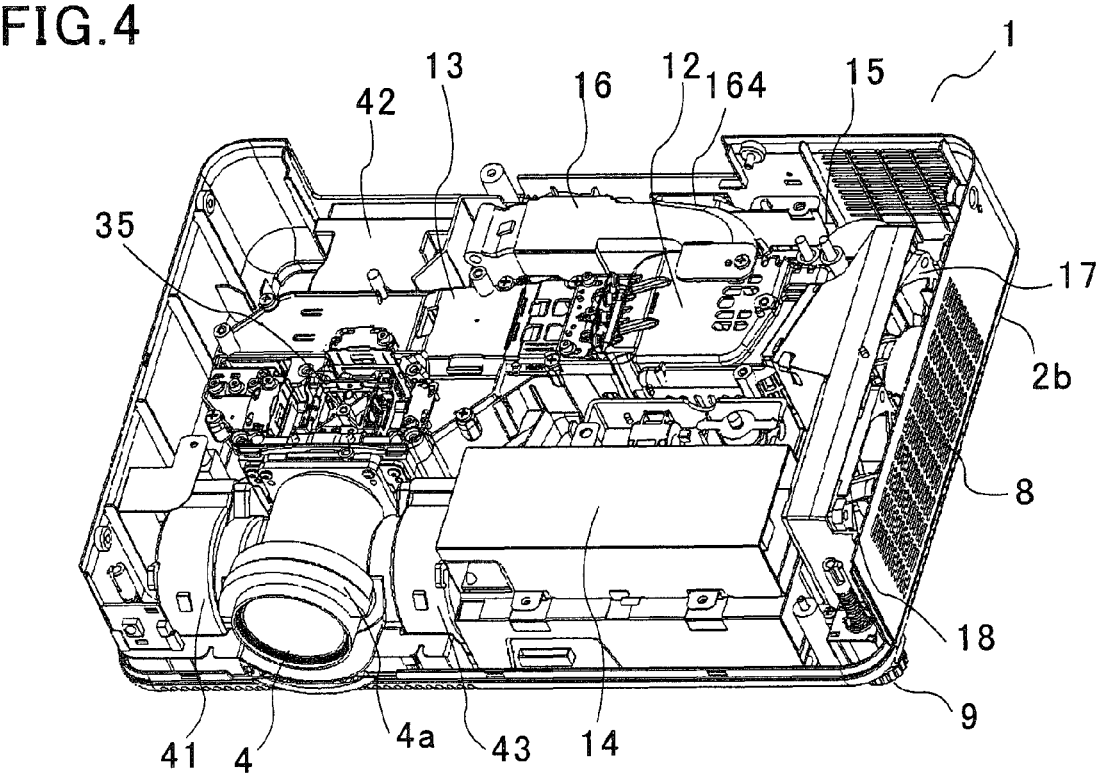
FIG. 4 is a perspective view of the projector, with its main control board removed.
Figure 5:
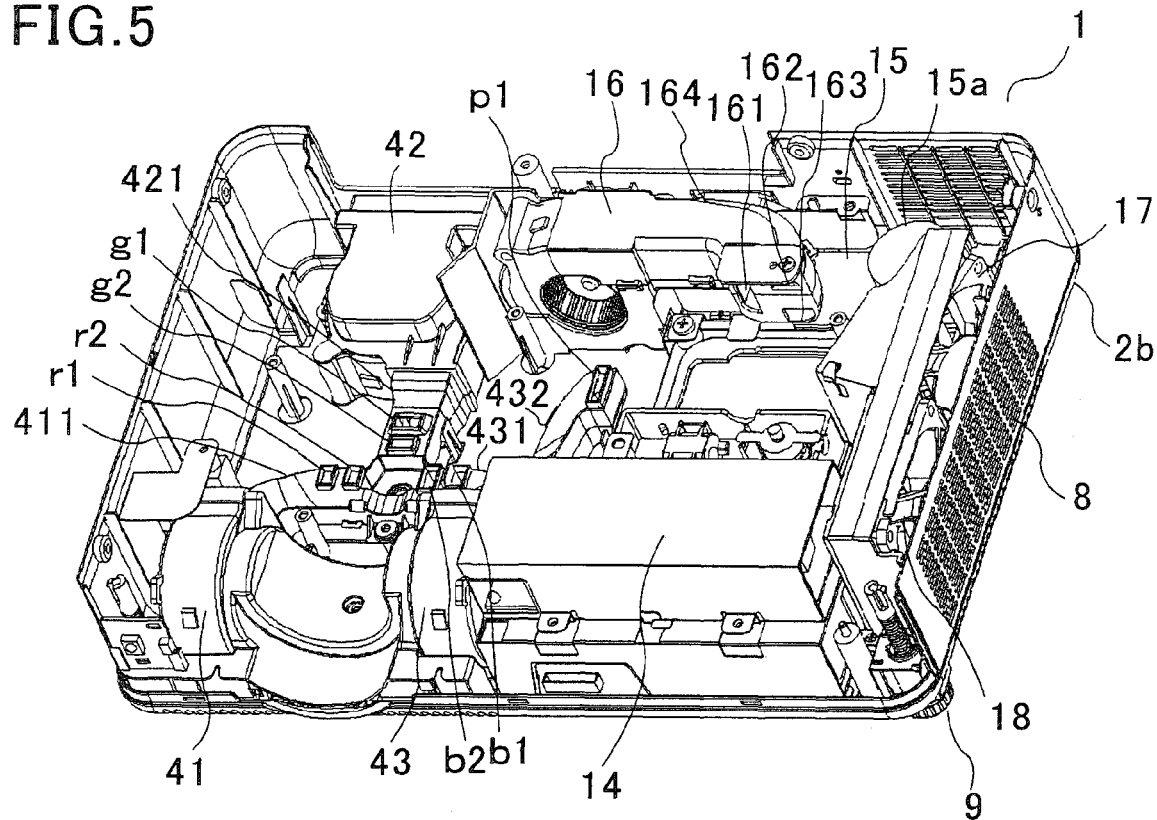
FIG. 5 is a perspective view, with its optical system further removed.
Figure 6:
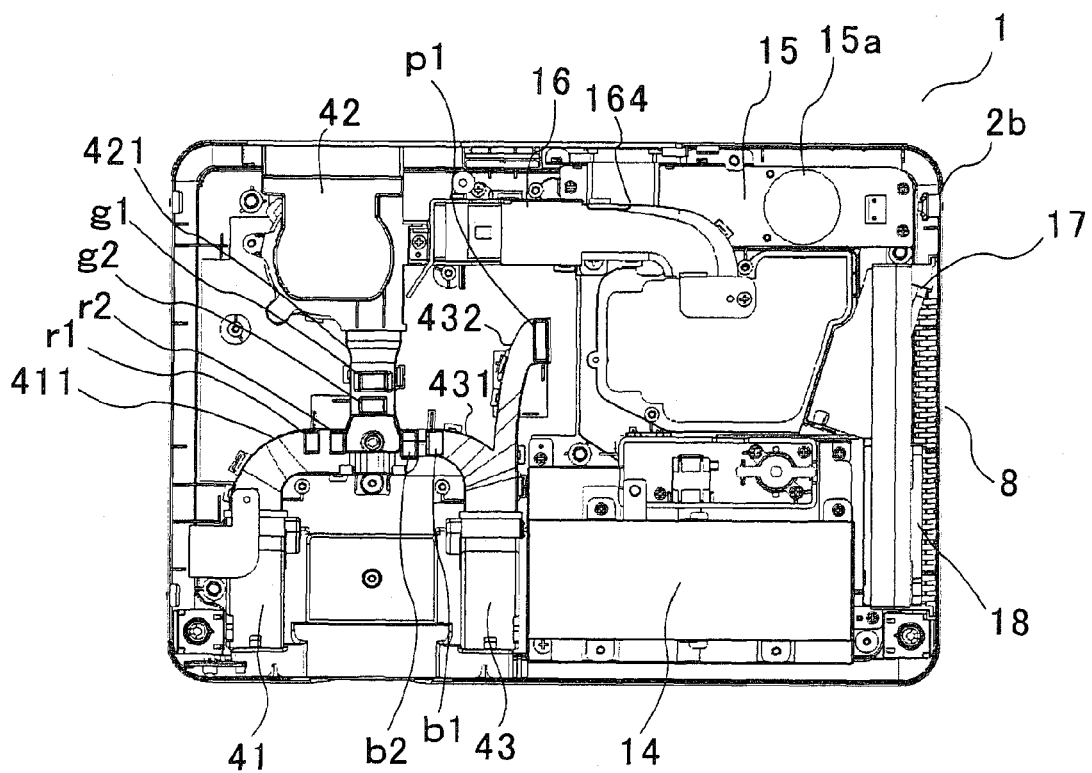
FIG. 6 is a plan view of the arrangement of the components shown in FIG. 5.

The invention will now be described in detail by way of example with reference to the accompanying drawings. FIG. 1 is a perspective view of a projection type image display apparatus in the form of a liquid crystal projector in accordance with one embodiment of the invention, as viewed from an upper oblique position with respect to the front end of the projector. FIG. 2 is a perspective view of the projector as viewed from an upper oblique position with respect to the rear end of the projector. FIG. 3 is a perspective view of the projector with its upper cover shown in FIG. 1 removed. FIG. 4 is a perspective view with its main control board removed. FIG. 5 is a perspective view with the optical components removed. FIG. 6 is a plan view of the components shown in FIG. 5.

Referring to FIGS. 1 and 2, there is shown a liquid crystal projector 1, having a case 2 serving as the frame thereof. The case is generally an oblong small thin parallelepiped having a width larger than the length. The case is has an upper cover 2a and a lower box 2b. The interior of the projector can be seen when the upper cover 2a and a main control board 4 are removed, as seen in FIG. 4.

It is seen in FIG. 4 that there is provided in the left front end of the projector a projector window 5 accommodating therein a projection lens 4. Formed in the left front section of the upper cover 2 is a manipulation window 6 in association with the projector window 5. A focus adjuster 4a for adjusting the projection lens 4 can be seen in the window 6. Installed on the left rear section of the upper cover 2a are operation buttons and indicators 7.

In accordance with another embodiment of the invention, there is formed a lattice of a multiplicity of narrow-spaced air outlet holes 8 in the right sidewall of the lower box 2b, as shown in FIG. 2. Provided at the opposite front corners of the bottom of the lower box 2b are legs 9 for adjusting the heights of the corners. Provided on the rear wall of the lower box 2b are a power supply terminal 10 to be connected to a power supply plug and an input-output power supply terminal 11 connected to a multi-voltage power supply cable.

As shown in FIGS. 3 and 4, a light source unit 12 is installed in the right end section of the case 2. The light source unit 12 and an optical system 13 associated with the projection lens 4 are arranged in an L-shape configuration. Arranged in front of the light source unit 12 is a power supply unit 14. The power supply unit 14 includes: a power circuit board having thereon an electric circuit for supplying electric power to different parts of the projector; a dedicated ballast circuit board for supplying electric power to the lamp; and a noise suppression filter 15 for suppressing the noise entering the power supply terminal 10.

In the embodiment shown herein, the noise suppression filter 15 is separated from the power supply unit 14, and is installed as close to the rear wall of the case and to the power supply unit 14 as possible. More particularly, the power supply unit 14 is arranged along the front wall of the oblong case 2, and the noise suppression filter 15 that includes an iron core coil 15a is arranged directly behind the power supply unit 14 and on an upper section of the rear wall of the power supply board.

In accordance with a further embodiment of the invention, a centrifugal fan 16 (fourth fan) serving as an intake fan for cooling the lamp is arranged behind the light source unit (i.e. on the rear side of the light source unit). Provided on one side of the light source unit 12 is an axial exhaust fan serving as a lamp cooling fan (fifth fan) 17. In addition, another axial fan serving as a further exhaust fan (sixth fan) 18 for discharging internal air is provided on one side of the power supply unit 14 and in parallel with the fan 17.

Figure 7:
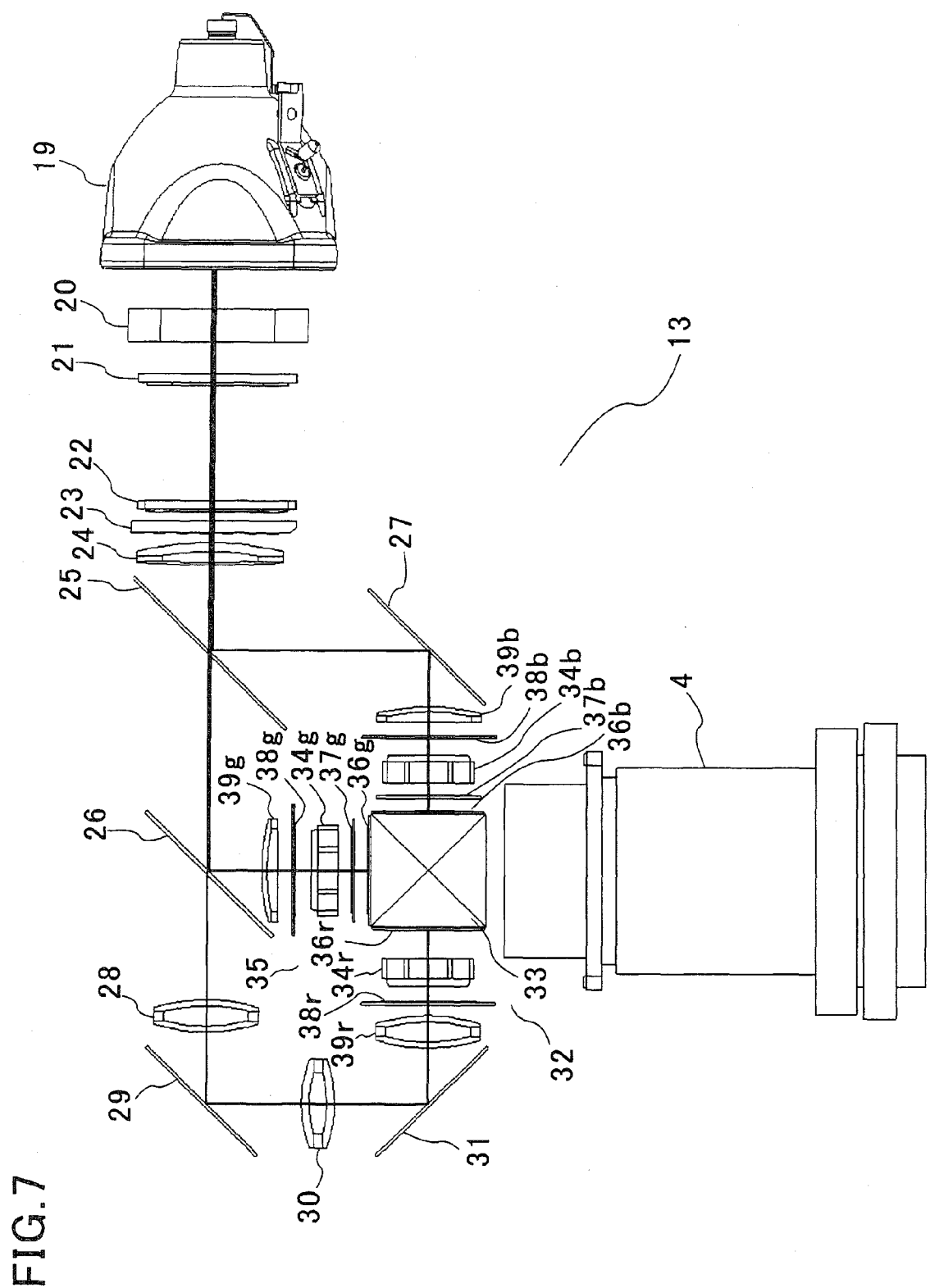
FIG. 7 shows in schematic diagram an arrangement of the optical system of the projector.

Referring to FIG. 7, there is shown an arrangement of the optical system 13 of the invention. It should be understood, however, that the invention is not limited to the optical system shown in FIG. 7. Rather, the invention can be applied to various other types of optical systems.

As seen in FIG. 7, white light emitted from the lamp 19 of the light source unit 12 is passed to a first dichroic mirror 25 via a condenser lens 20, first integration lens 21, second integration lens 22, polarization beam splitter (PBS) 23, and condenser lens 24.

Each of the first integration lens 21 and the second integration lens 22 consists of a rectangular array of many fly-eye lenses, and has a function to uniformize illumination intensity of the white light coming from the lamp 19.

The polarization beam splitter (PBS) 23 has a polarization splitting film and a retardation plate (or a half-wave plate). The polarization splitting film allows P-polarization component of light that has passed through the second condenser lens 22 to pass through the film, but causes S-polarization component to slightly change its optical path as it passes through the film. The P-polarization component that has passed through the polarization splitting film is converted into S-polarization component by the retardation film placed at the light-exiting side of the PBS 23, so that substantially all the light entering the beam splitting film will become S-polarized as it passes through the retardation film.

The light that has passed through the PBS 23 is passed to the first dichroic mirror 25 via the condenser lens 24. The first dichroic mirror 25 reflects the blue component of light, but allows red and green components to pass through it, so that the red and green components reach a second dichroic mirror 26. The second dichroic mirror 26 reflects the green component of light, and allows the red component to pass through it. As a result, white light from the lamp 19 is split by the first and second dichroic mirrors 25 and 26, respectively, into three beams of blue, green and red light.

The blue light reflected by the first dichroic mirror 25 is then reflected by a total reflection mirror 27. The green light reflected by the second dichroic mirror 26 is led to an image forming optical system 32. The red light that has passed through the second dichroic mirror 26 passes through relay lenses 28 and 30 and is reflected by further total reflective mirrors 29 and 31 and led to the image forming optical system 32.

In the image forming optical system 32, prism components 35 such as separate LCPs 34r, 34g, and 34b for red, green, and blue light (respectively referred to as R-, G-, and B-LCP) are detachably mounted on the three sides of a cubic color composition prism 33 as shown in FIG. 4. Further, a polarization plate 36r (referred to as exit side polarization plate) for red light is provided between the color composition prism 33 and the R-LCP 34r.

Similarly, an exit side polarization plate 36g and a pre-stage polarization plate 37g for green light are provided between the color composition prism 33 and the G-LCP 34g, and an exit side polarization plate 36b and a pre-stage polarization plate 37b for blue light are provided between the color composition prism 33 and the B-LCP 34b. Further polarization plates 38r, 38g, and 38b (respectively referred to as incidence side polarization plates) and condenser lenses 39r, 39g, and 39b for red, green, and blue light (respectively referred to as R-, G-, and B-condenser lens) are arranged on the respective incidence sides of the R-, G-, and B-LCPs 34r, 34g, and 34b.

As a consequence, the blue light reflected by the first dichroic mirror 25 and the total reflection mirror 27 is led to the B-condenser lens 39b and further to the color composition prism 33 via the incidence side polarization plate 38b, B-LCP 34b, pre-stage polarizing plate 37b, and exit polarizing plate 36b. The green light reflected by the second dichroic mirror 26 is led to the G-condenser lens 39g and further to the color composition prism 33 via the incidence side polarization plate 38g, G-LCP 34g, pre-stage polarizing plate 37g, and exit side polarization plate 36g. Similarly, the red light that has passed through the first and second dichroic mirrors 25 and 26, respectively, and is reflected by the two total reflective mirrors 29 and 31, is led to the R-condenser lens 39r and further to the color composition prism 33 via the incidence side polarization plate 38r, R-LCP 34r, and exit polarizing plate 36r.

The three colored beams of imaging light introduced into the color composition prism 33 are composed to a colored imaging light beam, which is projected by the projection lens 4 onto a front screen.

Figure 8:
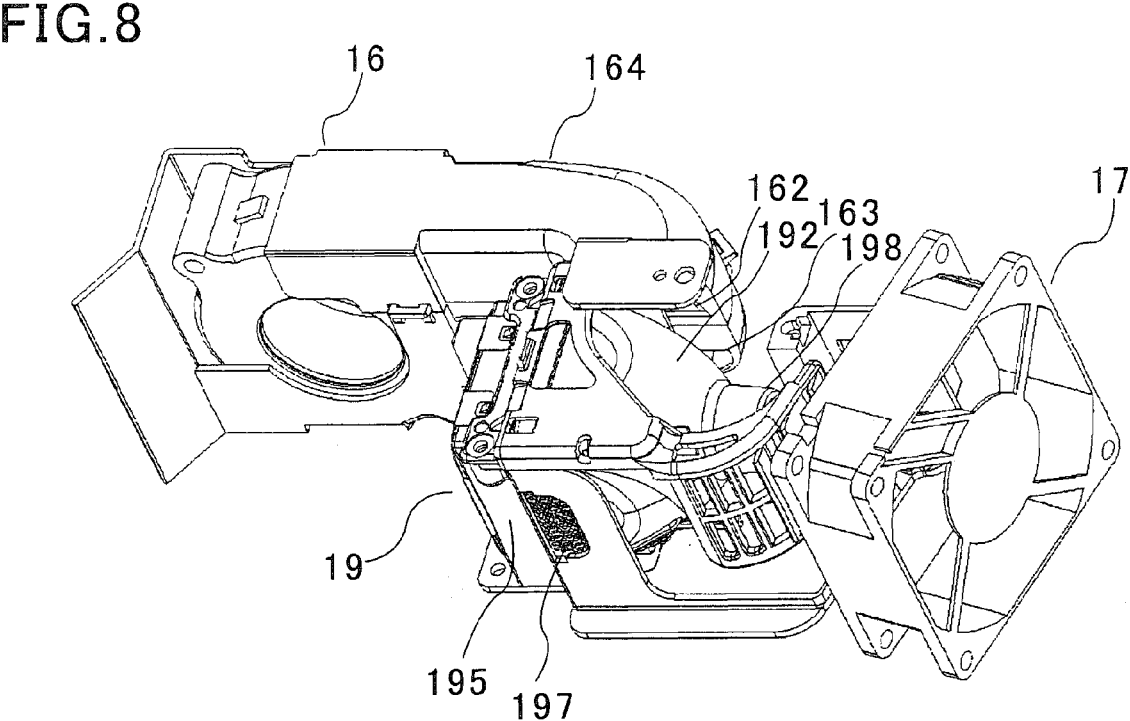
FIG. 8 is an enlarged perspective view of a principal part of the lamp cooling structure of the embodiment, as viewed from an upper oblique position with respect to the front end of the projector.
Figure 9:
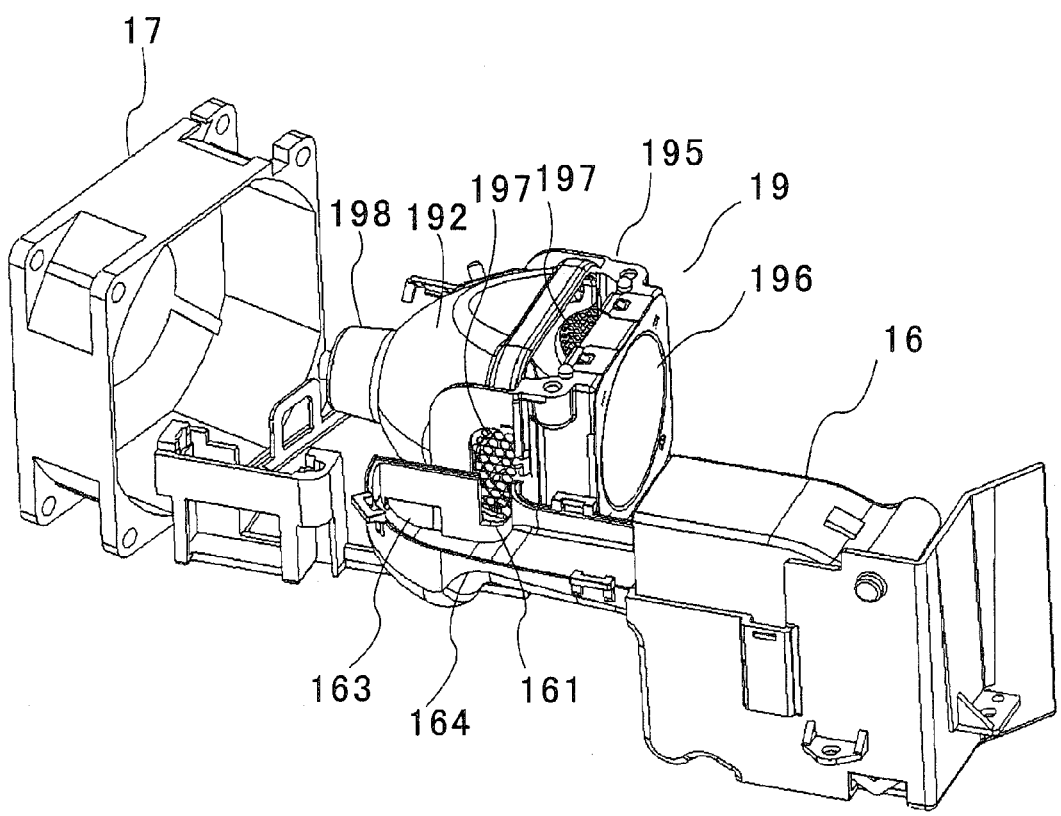
FIG. 9 is a perspective view of an air duct for use in the lamp cooling structure of FIG. 8 with the upper half section thereof removed, as viewed from an upper oblique position with respect to the rear end of the air duct.
Figure 10:
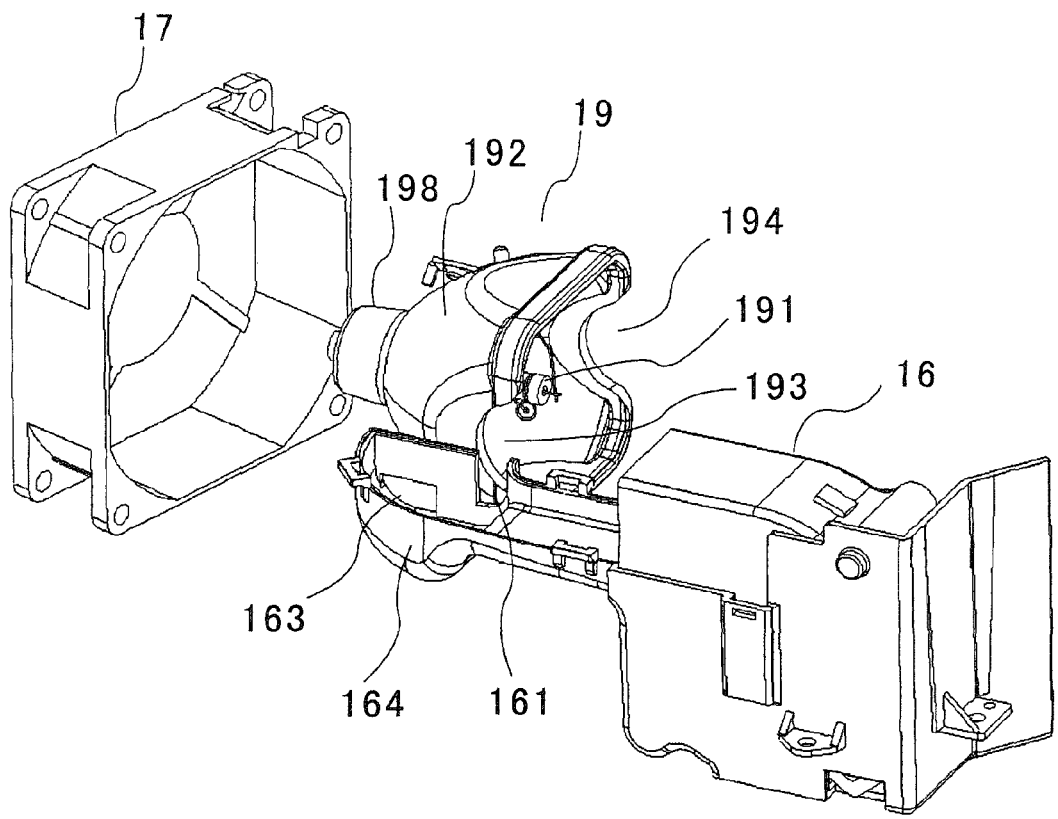
FIG. 10 is a perspective view of a light source unit shown in FIG. 9 with the lamp stand thereof removed.
Figure 11:
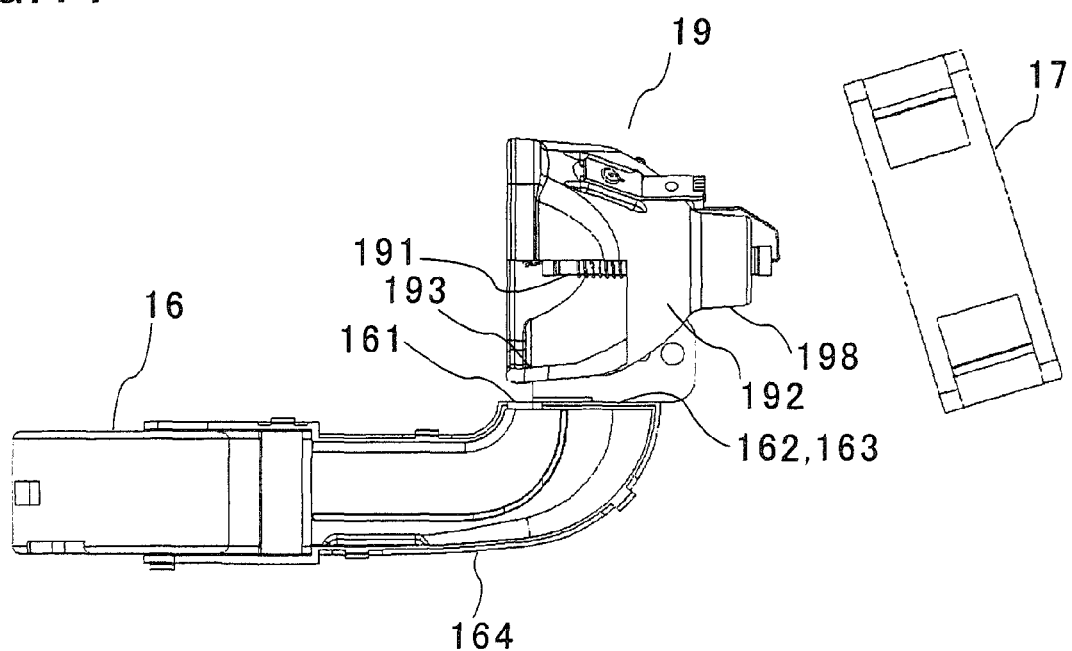
FIG. 11 is a longitudinal cross section of a principal part of the air duct.

Referring to FIGS. 8-11, there is shown in enlarged perspective or plan view an arrangement of a main section of the lamp cooling structure. More particularly, FIG. 8 shows the cooling structure as viewed from an upper oblique position with respect to the front end of the cooling structure; FIG. 9 shows the cooling structure as viewed from an upper oblique position with respect to the rear end, the figure depicting the condition of the duct of the cooling structure with the upper section thereof removed; FIG. 10 shows the cooling structure with the lamp stand thereof removed; and FIG. 11 is a cross section of a main section of the cooling structure as viewed from behind.

In the embodiment shown herein, the lamp 19 has an arc tube 191, which is a high-pressure mercury tube or a halogen tube; a parabolic reflector configured to cover the arc tube 191; and a light-reflective cover 192 having a front opening. The light-reflective cover 192 is provided with an air inlet 193 formed at the edge of the front opening thereof and an air outlet 194 facing the air inlet 193, as shown in FIG. 10.

This lamp 19 is installed on an aluminum lamp stand 195 as shown in FIGS. 8 and 9. The aluminum lamp stand 195 is equipped with a heat-resistive glass plate 196 for covering the front opening of the light-reflective cover 192, and with a ventilation net 197 having a multiplicity of holes in association with the air inlet 193 and air outlet 194 such that the net will prevent debris of the arc tube 191 from being scattered in the event that the arc tube 191 is fractured.

Conventional lamp cooling structures are so designed to cool only the lamp using fans and exhaust ports that the temperature of the exhausted air is high as it is discharged from the exhaust ports. Such prior art arrangement is not suitable for a projection-type compact high-power image display apparatus such as a liquid crystal projector, since the temperature of the exhausted air would become excessively hot after the air had cooled a high-power lamp. In other words, it is difficult with the conventional cooling structure to lower the temperature of the exhaust air and cool the lamp simultaneously. One way to lower the exhaust air temperature is to increase the output power (rotational speed) of the fan, which, however, increases fan noise.

In the embodiment shown herein, therefore, there are provided a lamp cooling system that includes:

an air outlet 161 associated with an air inlet 193 formed in the light-reflective cover 192 to ventilate the lamp 19;

an intake fan 16 (fourth fan) sending air to exterior-cooling air outlets 162 and 163 formed to face the light-reflective cover 192; and an exhaust fan 17 (fifth fan) for discharging the ambient air around the lamp 19 through the air outlet holes 8 formed in one sidewall of the case 2. The intake fan 16 is a centrifugal fan, while the exhaust fan 17 is an axial fan.

It is noted that the exterior-cooling air outlets 162 and 163 associated with the intake fan 16 are arranged away from the external central surface of the light-reflective cover 192 of the lamp 19. It is also noted that the exhaust fan 17 is obliquely placed. That is, it is arranged to inspire air towards the exterior-cooling air outlets 162 and 163 associated with the intake fan 16.

A duct 164 extends from the intake fan 16 to one side of the lamp 19 posterior to the intake fan 16. The air outlets 161, 162, and 163 are formed at the end of the duct 164 facing the lamp 19. The interior-cooling air outlet 161 is formed in association with the air inlet 193 formed in the light-reflective cover 192 of the lamp 19. The two exterior-cooling air outlets 162 and 163 are formed above and below the central region of the exterior of the light-reflective cover 192.

As described above, the distance from the central region of the exterior of the lamp 19 to the exterior-cooling air outlets 162 and 163 and the oblique angle of the direction of inspiration of the exhaust fan 17 relative to the exterior-cooling air outlets 162 and 163 are set based on the cooling requirement of the lamp 19 and the permissible exhaust air temperature.

In this arrangement, although the lamp 19 has the arc tube 191 that can be heated to a very high temperature, the interior of the lamp 19 can be efficiently cooled owing to the interior-cooling air outlet 161 of the intake fan 16. The exterior of the light-reflective cover 192 of the lamp 19 (including a neck section that protrudes from the rear end of the cover 192) will not be heated as high as the interior of the lamp 19, and is cooled to a moderate temperature by the intake fan 16 sending air through the exterior-cooling air outlets 162 and 163, though the intake fan 16 is located away from the central region of the cover exterior.

It is noted that the exhaust fan 17 is arranged with its air inspiration face obliquely oriented to the exterior-cooling air outlets 162 and 163 associated with the intake fan 16 adjacent the lamp 19, so that the air is discharged from the exterior-cooling air outlets 162 and 163 to the exterior of the lamp to cool it, and, at the same time, partly taken in the exhaust fan 17 to be mixed with the hot air that discharged from the lamp 19, thereby lowering the temperature of the exhaust air from the exhaust fan 17.

As a result, reduction in temperature of both the lamp 19 and the exhaust air, and also reduction of the fan noise, can be simultaneously achieved without increasing the output power of the intake fan 16 (fourth fan) and exhaust fan 17 (fifth fan).

It should be noted that the two exterior-cooling air outlets 162 and 163 associated with intake fan 16 located at a distance from the central region of the exterior of the lamp 19 can cool the exterior of the lamp 19 substantially uniformly.

As described above, the distance from the central region of the exterior of the lamp 19 to the exterior-cooling air outlets 162 and 163 associated with the intake fan 16 and the oblique angle of the air inspiration face of the external fan 17 with respect to the outlets can be set based on the cooling requirements of the lamp 19 and the allowable temperature of the exhaust air. This configuration enables simultaneous realization of downsizing and power up of the lamp 19.

It is further noted that the intake fan 16 may have a large positional freedom, since the air outlets 161, 162, and 163 associated with the intake fan 16 are formed in the wall of the duct 164 that extends from the intake fan 16 to the lamp 19.

Thus, in the liquid crystal projector 1 in accordance with the embodiment shown herein, cooling of the lamp 19, lowering of the temperature of the exhaust air, and reduction of fan noise can be simultaneously achieved without increasing the output powers of the fans 16 and 17 by the lamp cooling structure.

Figure 12:
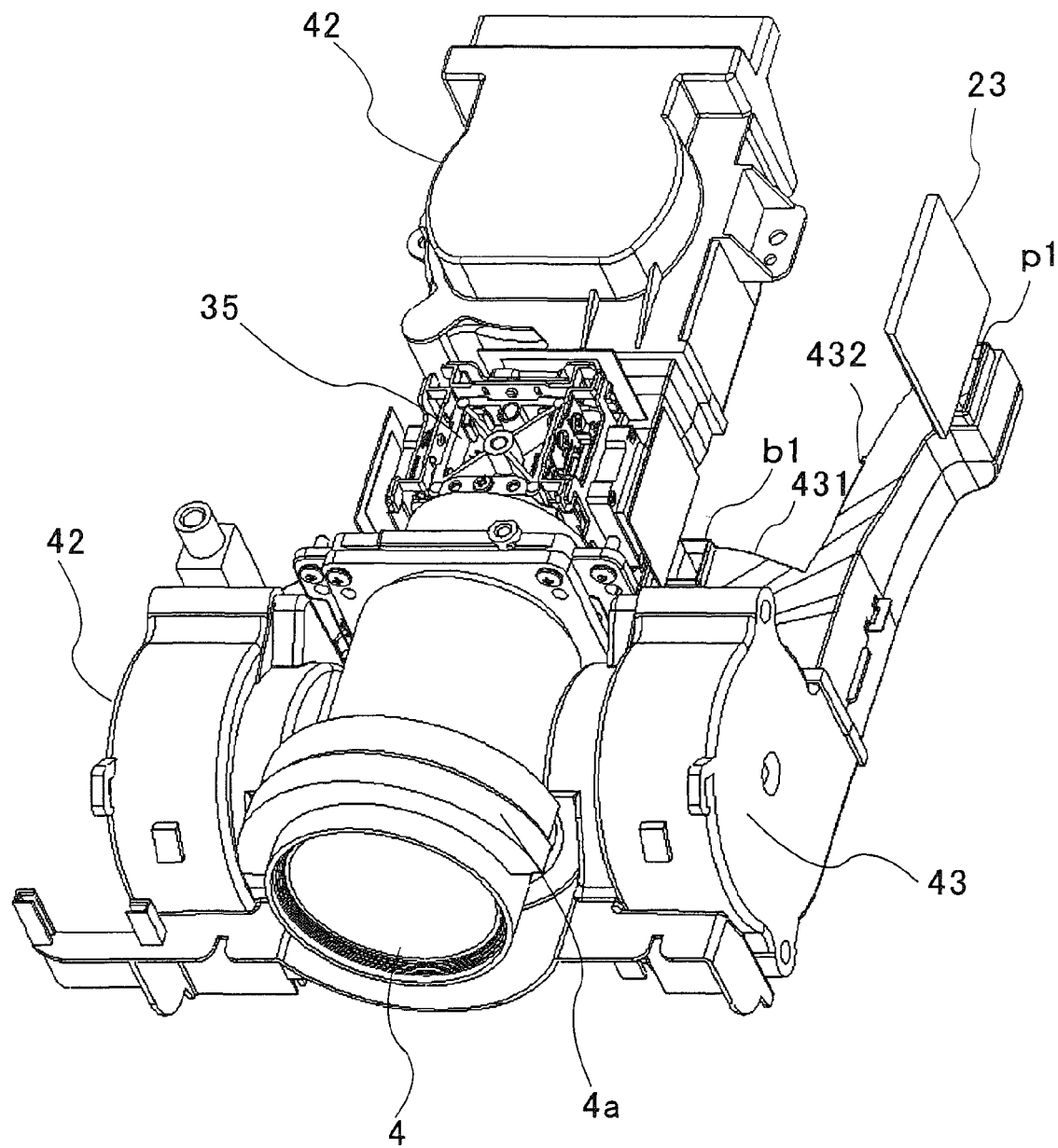
FIG. 12 is an enlarged view of the main section of the optical components cooling structure in accordance with the embodiment, as viewed from an upper oblique position with respect to the front end thereof.
Figure 13:
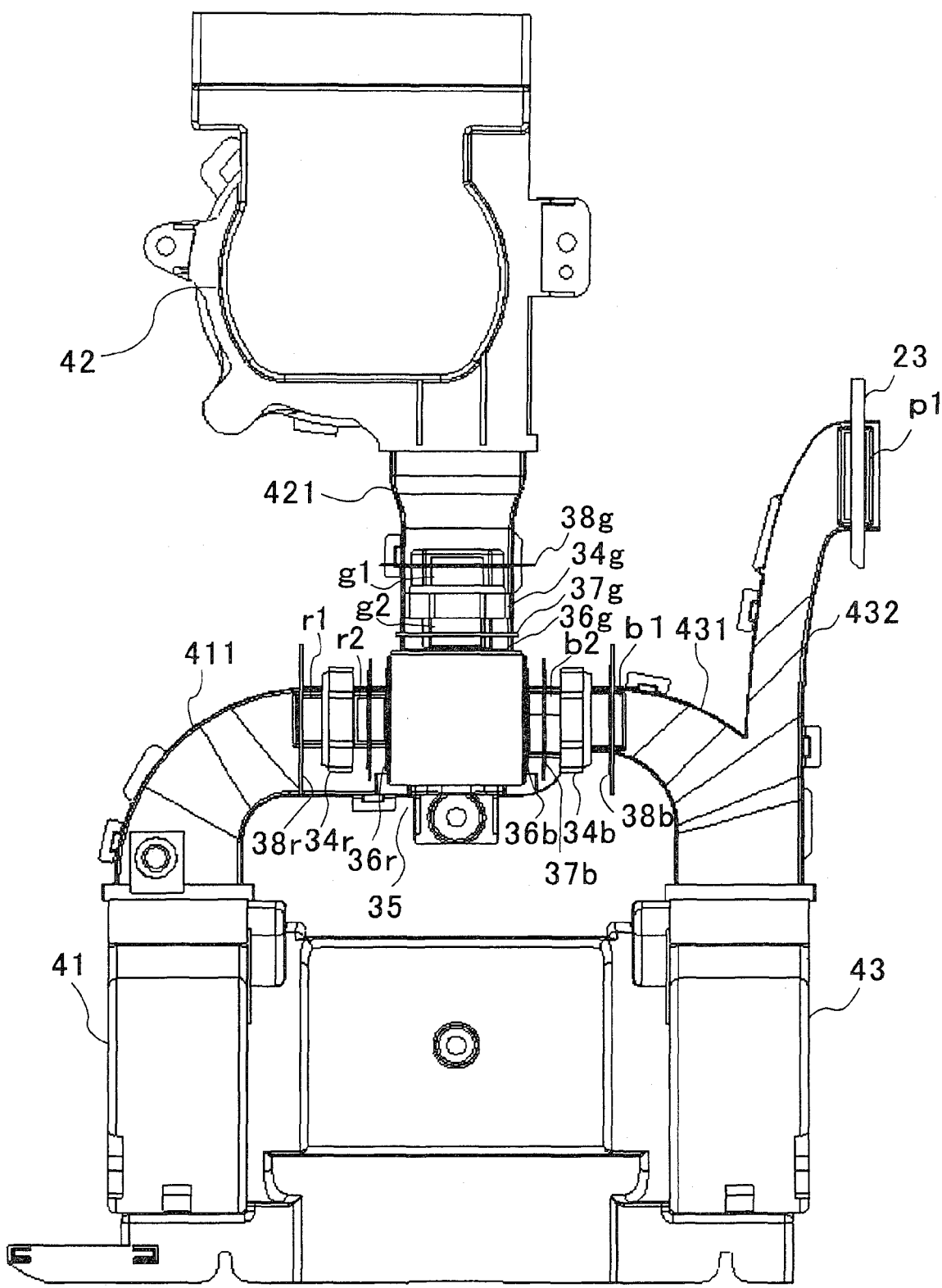
FIG. 13 is a plan view of the optical components cooling structure.
Figure 14:
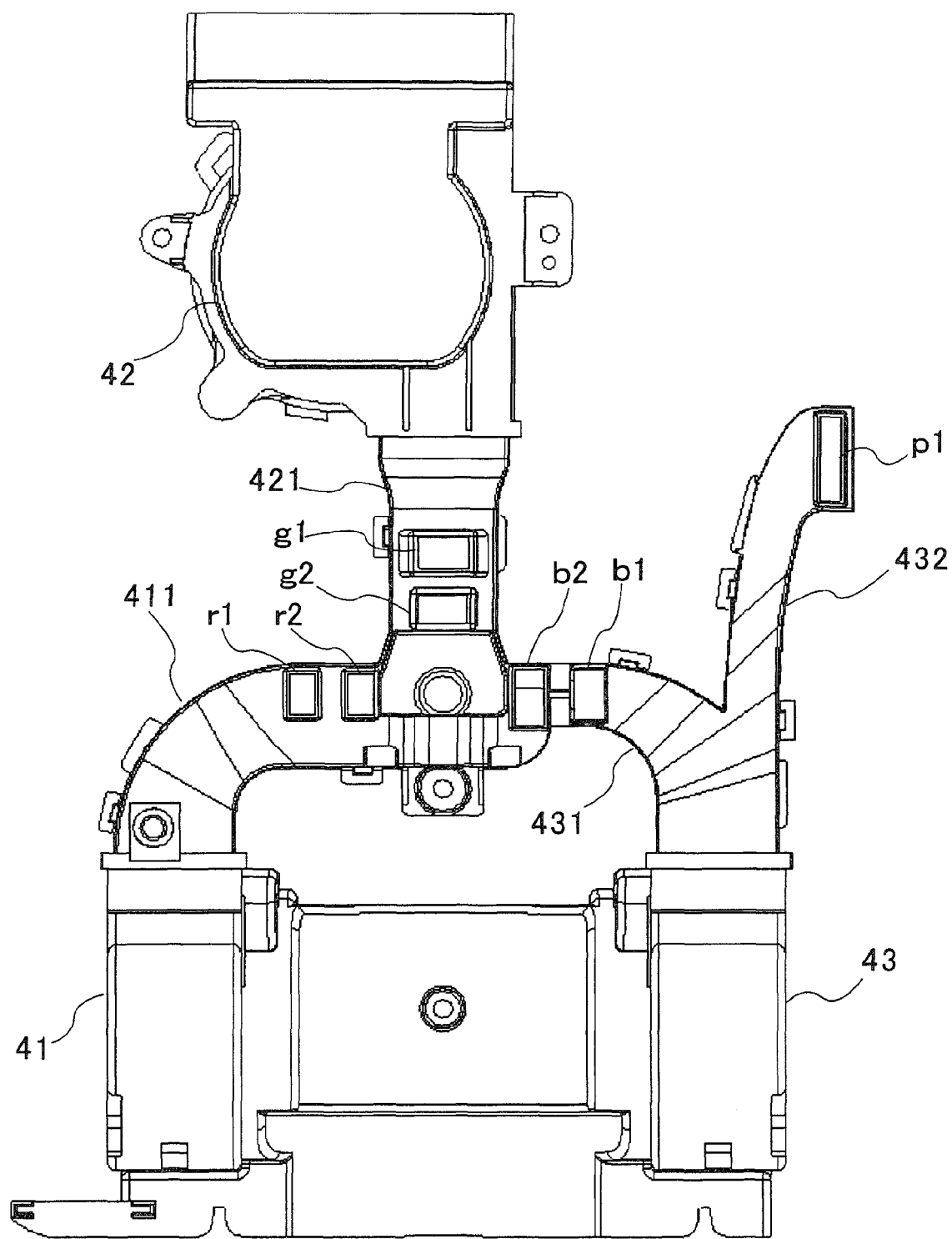
FIG. 14 is a plan view of the optical components cooling structure with the optical components removed.
Figure 15:
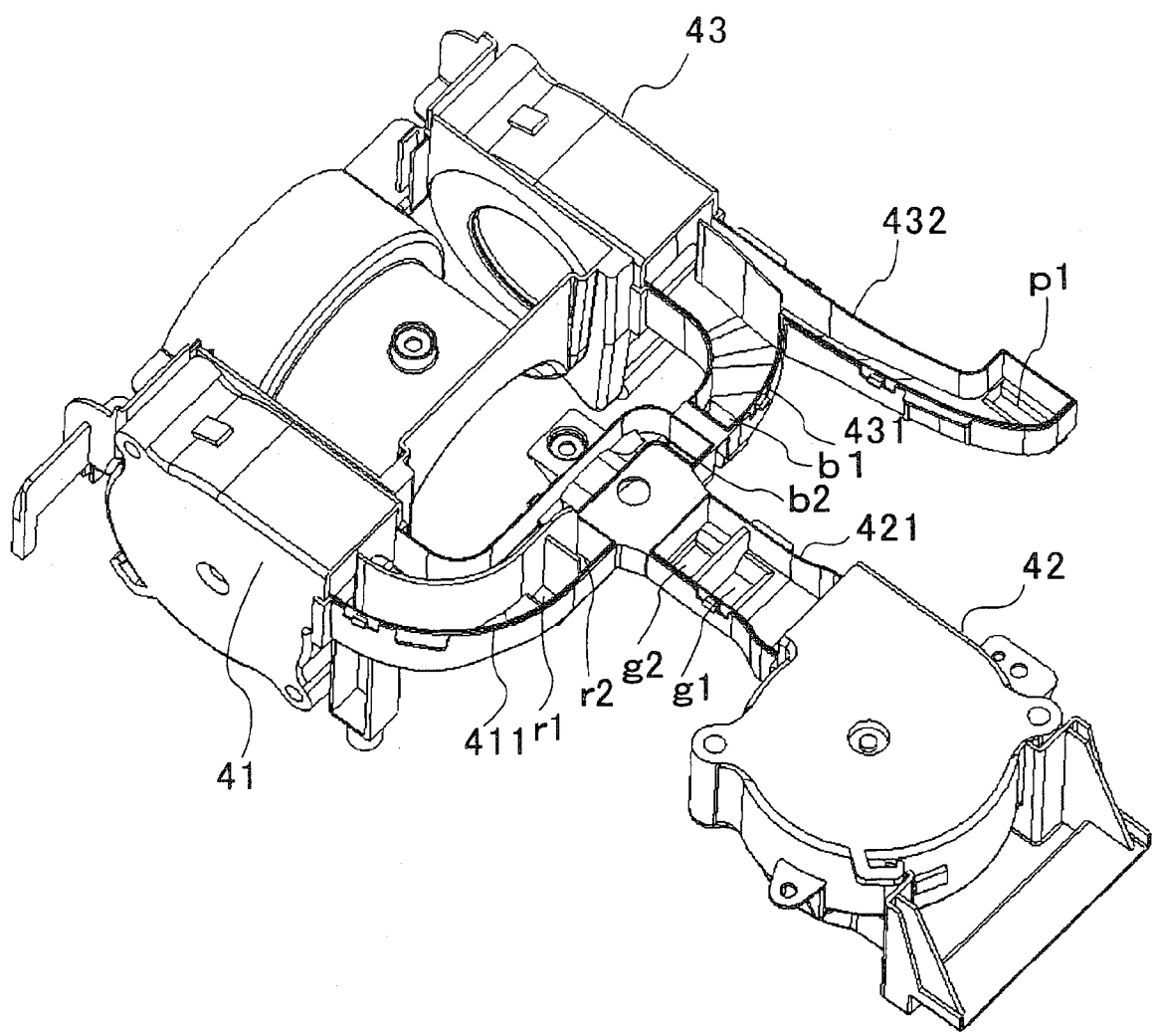
FIG. 15 is a rear elevation of the air duct with the lower half section thereof removed.

Referring to FIGS. 12-15, there is shown in enlarged view a major section of the optical component cooling structure. More particularly, FIG. 12 is a perspective view of the structure as viewed from an upper oblique position with respect to the front end thereof; FIG. 13 is a plan view of the structure; FIG. 14 is a plan view with the optical components including LCPs removed; and FIG. 15 is a rear elevation of the structure with the lower half section of the duct removed.

As is well known, there are provided in conventional projectors three cooling fans one for each of the R-, G-, and B-LCPs and associated polarization plates placed on the incidence and exit sides of the respective LCPs.

However, a temperature rise in, and hence the required cooling for, each of the R-, G-, and B-LCPs and associated polarization plates disposed on the incidence and exit sides of the respective LCPs varies from one LCP to another, depending on the degree of ultraviolet [UV] deterioration. Particularly, in order to prevent deterioration, the B-LCP and its associated polarization plates require more cooling than other panels and plates, since blue light lies close to the ultraviolet zone.

Conventionally, enhancement of lamp output, down-sizing, and cost saving of a projection type image display apparatus such as a liquid crystal projector have been simultaneously pursued through improvement of lamp luminosity and luminosity per unit area.

However, prior art cooling systems utilizing a fan for each of the color LCPs cannot deal with the cooling of a projector having an enhanced lamp luminosity and luminosity per unit area. If, as a countermeasure, the output powers (rotational speeds) of the fans are increased, fans noise will increase to an unacceptable level. In addition, the PBS must be cooled.

In the present invention, therefore, there are provided six air outlets r1, r2, g1, g2, b1, and b2, provided at the incidence sides as well as exit sides of the respective LCPs 34r through 34b, to discharge air sent by the first through third intake fans 41-43 via respective first through third air ducts (the ducts hereinafter referred to as air ducts) 411-431. There is also provided an air outlet p1 for sending onto the PBS 23 air sent by the air intake fan 43 via the third air duct 431. In addition, a further air duct is connected from the fan 41 to each of the incident sides and exit side outlets b1 and b2, respectively, for the B-LCP 34b to separately deliver additional cooling air from the intake fan 41. The intake fans 41-43 (first through third fans) are centrifugal fans.

In other words, the fans and the air ducts can be configured as follows.

The intake fan 43 sends air to the incidence side outlet b1 associated with the B-LCP 34b and to the outlet p1 for the PBS 23, and the two other intake fans 41 and 42 send air to the incidence side outlets r1 and g1 and to the exit side outlets r2 and g2 associated with the respective R-LCP 34r and G-LCP 34g.

More particularly, the air ducts of the embodiment are configured as follow. One of the two intake fans, intake fan 42 for example, sends air via a second air duct 421 to the incidence side and exit side outlets g1 and g2, respectively, for the G-LCP 34g, while the other intake fan 41 sends air via an extended first air duct 411 to the incidence side and exit side outlets r1 and r2, respectively, for the R-LCP 34r and to the exit side outlet b2 for the B-LCP 34b.

In this arrangement, the three intake fans 41-43 can cool the incidence sides and the exit sides of the respective LCPs 34r, 34g, and 34b as well as the PBS 23. Furthermore, the incidence side and the exist side of the B-LCP requiring a larger amount of cooling air can be sufficiently cooled by the separate intake fans 43 and 41. Thus, even when the luminosity and luminosity per unit area are increased, the LCPs 34r, 34g, and 34b, and the polarizing plates 36r, 36g, 36b, 37g, 37b, 38r, 38g, and 38b as well as PBS 23 can be cooled by the first through third intake fans 41-43 without increasing the output powers (rotational speeds) of these fans, and hence without increasing fan noise either.

Alternatively, the ducts can be arranged in the following manner. The intake fan 43, say, sends air to the incidence side outlet b1 for the B-LCP 34b and to the outlet p1 for the PBS 23, while other two intake fans 41 and 42 send air to the respective incidence side outlets r1 and g1 and to the exit side outlets r2 and g2 for the R-LCP 34r and G-LCP 34g, respectively, and to the exit side outlet b2 for the B-LCP 34b.

Accordingly, the function and merits of the optical component cooling structure as described above can be achieved utilizing the shortest air duct in the optical system 13 if the B-LCP 34b is arranged adjacent the PBS 23 in accordance with the embodiment shown herein. It is noted that the air sent from the intake fan 41 to the R-LCP 34r generating the least heat is bifurcated to the exit side outlet b2 for the B-LCP 34b, and to the G-LCP 34g generating the most heat if the air sent from the intake fan 42 thereto is insufficient.

The ducts can be alternatively arranged as follows. One of the intake fans 41 and 42 (fan 42 for example) may be adapted to send air to the incidence side and the exit side outlets g1 and g2, respectively, for the G-LCP 34*g*, while the other fan (fan 41 for example) may send air to the incidence side and exit side outlets outlet r1 and r2, respectively, for the R-LCP 34*r* and to the exit side outlet b2 for the B-LCP 34*b*. This arrangement enables realization of the function and the merits of the optical component cooling structure as described above without complicating duct structure.

Since the liquid crystal projector 1 in accordance with the embodiment of the invention has an optical component cooling structure as described above, three fans can cool the LCPs, polarization plates, and PBS without raising the output power (or rotational speed) of the fans or without raising the fan noise, even if the luminosity of the lamp and luminosity per unit area are raised.

Next, the power supply unit of the embodiment will now be described. In general, a noise suppression filter is provided on the electric circuit board of a power supply unit, as stated above.

A need exists for a compact and cost effective projection type image display apparatus such as a liquid crystal projector equipped with a lamp having an enhanced output power to provide high luminosity, for which the output power of the power supply unit must be enhanced accordingly.

In a low-power model, there is no problem in mounting a noise suppression filter on the electric circuit board, as in conventional projectors. However, in a high-power model, a noise suppression filter has an iron core that cannot be downsized, and hence the power supply unit must become large.

As the power supply unit becomes large, a larger fan must be used to cool the unit, or the output (or rotational speed) of the fan must be raised, which results in degradation of the cooling capability of the projector and increase fan noise. If, as a measure, an independent noise suppression filter is separately installed, its connecting cord is likely to generate a noise. In addition, EMC (electromagnetic compatibility) of the filter is difficult to secure, since it contains an additional iron core. It also adds an extra cost to the projector.

In the present embodiment, therefore, the noise suppression filter 15 is separated from the power supply unit 14 and placed as close to the rear wall of the projector having a power supply terminal 10 and to the power supply unit 14 as possible, as described in the above example.

More particularly, when the power supply unit 14 is arranged adjacent the front wall of the oblong case 2, the noise suppression filter 15 is arranged along the opposite rear wall of the case 2 (i.e., opposite the power supply unit 14).

In this arrangement, even if the output of the lamp 19 is raised, the power supply unit 14 can be down-sized. Hence, the cooling performance of the fan can be improved and fan noise can be reduced. Further, by minimizing the length of the connecting cord, not only the EMC is improved (since the amount of the iron core used is reduced) but also the cost of the projector is reduced accordingly.

Since the noise suppression filter 15 is arranged adjacent the rear wall of the case 2 that has the power supply terminal 10, it requires no power cord that hinders use of the sidewall of the case 2, thereby conveniently providing the function and merits as described above.

Alternatively, the power supply unit 14 can be arranged along the front wall of the oblong case 2 and the noise suppression filter 15 arranged on the opposite rear wall (i.e., opposite the power supply unit 14) to minimize the length of the connection cord. Then, the same function and merits as described above can be achieved without complicating the arrangement of the components in the case 2.

As described above, even if the output power of the lamp 19 is enhanced, the cooling capability, fan noise level, and the EMC of the projector 1 are all improved in accordance with the embodiment shown, thereby enabling realization of a cost effective liquid crystal projector.

In the example shown herein, the case 2 is oblong, i.e. the width is larger than the length, so that the connection cord can be minimized in length by arranging the power supply unit 14 and noise suppression filter 15 in parallel with each other on the front wall and rear wall, respectively. In the case where the case 2 is longer than is wide, however, the cord cannot be minimized as stated above. In this case, the noise suppression filter may be arranged to extend in the longitudinal direction and near the rear wall and the power supply unit.

Next, the exhaust structure in accordance with the present embodiment will now be described. Conventionally, two exhaust fans for cooling the lamp and power supply unit are arranged in a row along the lamp.

As described above, enhancement of the output power of the lamp and down-sizing of a projector are overwhelmingly needed for a projection type image display apparatus such as a liquid crystal projector. In fulfilling these objects simultaneously, it is an essential issue to lower the temperature of the exhaust air and fan noise, since the lamp will generate hot air.

However, in the conventional technology, in order to lower the fan noise arranged in a row, they must be a disposed at a distance from the sidewall of the case to thereby leave a space between the fans and the sidewall. This arrangement, however, prevents down-sizing of the projector. Furthermore, in order to mix hot air expelled from the hot lamp with rather cooler air discharged from the power supply unit, these fans are lined up at an angle, i.e. obliquely arranged in a V-shape configuration, which arrangement also disadvantageously requires some space for the fans, which is not favorable to the down-sizing.

In the present embodiment, therefore, the fan 17 (fifth fan) for primarily discharging air from the lamp 19 (installed in the light source unit 12) and the exhaust fan 18 (sixth fan) for primarily discharging air from the power supply unit 14 are arranged side by side, as shown in FIGS. 3 and 4, in such a way that one end of the exhaust fan 17 (fifth fan) is skewed inwardly (i.e. one end offset inward of the case) and that one end of the exhaust fan 18 (sixth fan) is offset inside the expiration face of the skewed fan 17 so as to cause the air stream expired from the exhaust fan 17 (fifth fan) is directed to the air stream expired from the exhaust fan 18 (sixth fan).

In addition, the exhaust fan 17 is angled (i.e. placed at an angle) to a latticed or narrow-spaced many exhaust holes 8 formed in the sidewall of the case, so that the air stream from the holes 8 are discharged in an oblique forward direction.

Figure 16:
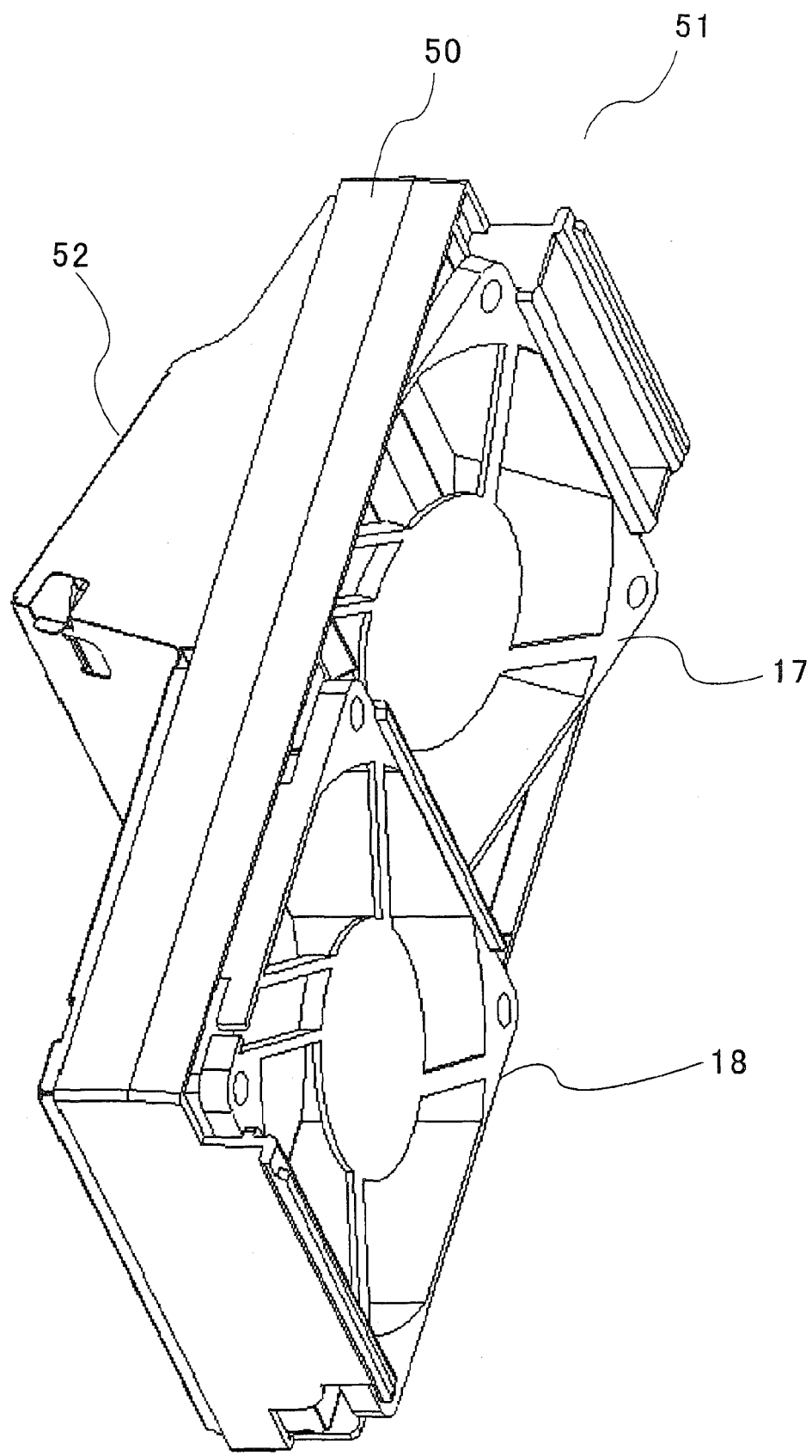
FIG. 16 is a perspective view showing an arrangement of the exhaust fan unit of an exhaust system in accordance with the embodiment.
Figure 17:
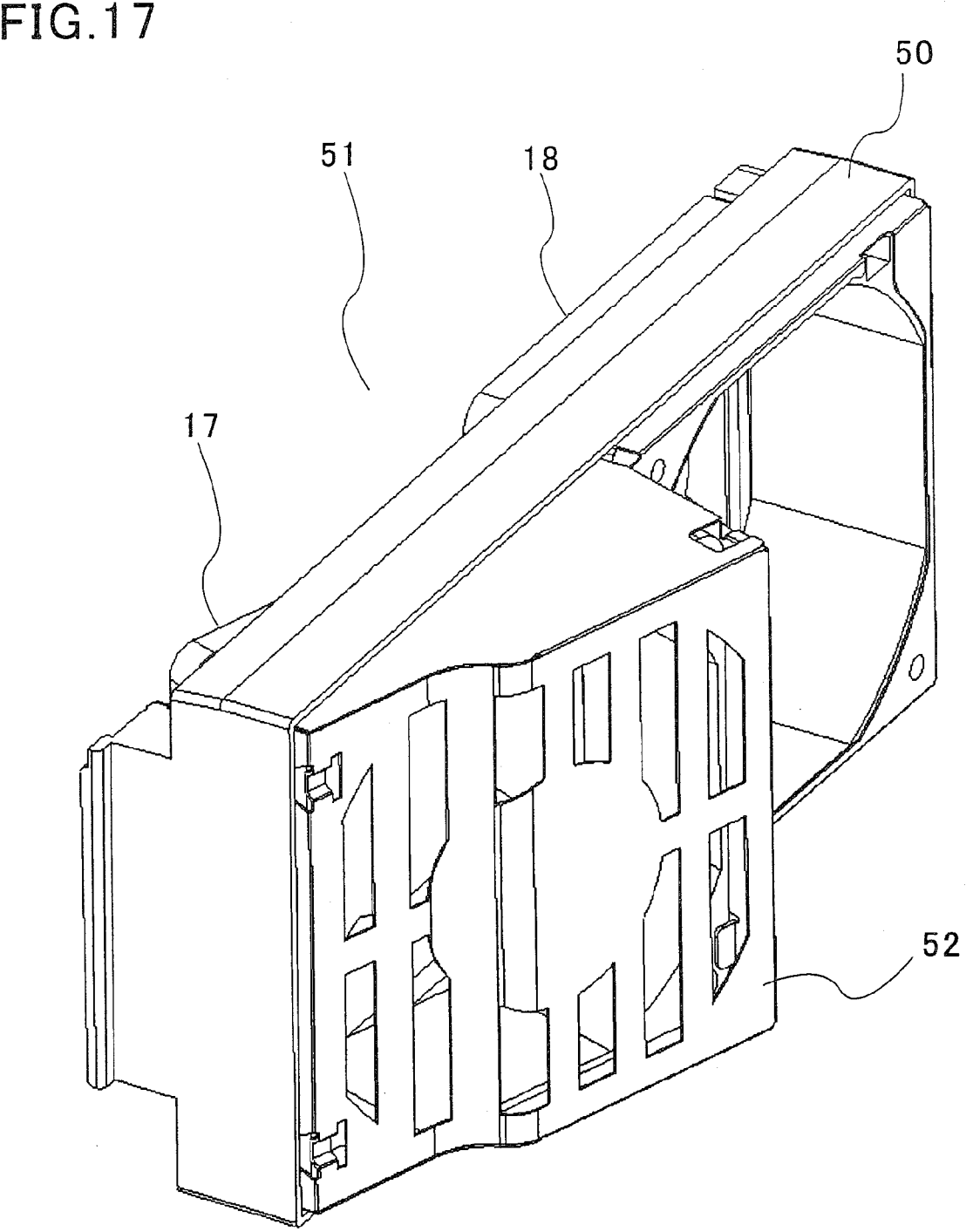
FIG. 17 is an oblique perspective view of the exhaust fan unit shown in FIG. 16, as viewed from behind.

As shown in FIGS. 16 and 17, in implementing the above-described fan system, the exhaust fans 17 and 18 may be preliminarily fixed to the frame to unitize them with the frame 50 of the case 2. If an exhaust fan unit 51 thus formed is provided at a predetermined position below the lower box 2*b* of the case 2, the above described arrangement structure can be easily obtained.

It is noted that, since the exhaust fan 17 inspires hot air collected from the lamp 19, the central section of the fan 17 behind the motor is covered with a panel 52 for protecting the motor against the hot air, as shown in FIG. 17.

In this fan configuration, the exhaust fan 17 is inwardly skewed (or obliquely angled to the wall of the case), so that the fan does not prevent down-sizing of the projector. Further, this configuration permits a gap to be created between the sidewall of the case and the exhaust fan 17, thereby facilitating reduction of the fan noise. Moreover, temperature of the exhaust air can be reduced due to the fact that hot air from the lamp 19 is mixed with relatively cooler air from the power supply unit 14 before they are discharged from the projector. Although the lamp gets heated to a high temperature, the above described effects can be achieved much easier in this arrangement than in conventional one owing to the space between the lamp and the exhaust fan.

It should be understood that the power supply unit 14 is not so high as the lamp 19, so that the air sent to the power supply unit 14 can be also used to ventilate the lamp 19, though the exhaust fan 18 is primarily used to ventilate the power supply unit 14.

It is noted that, since the exhaust fan 17 (fifth fan) for exhausting the lamp 19 is arranged at an angle to the many latticed narrow-spaced exhaust holes 8 formed in the sidewall of the case, the hot exhaust air from the lamp 19 does not readily flow through it, so that the air can be easily mixed with the relatively cooler air expired from the exhaust fan 18 (sixth fan).

Furthermore, since the hot air discharged from the lamp 19 is released from the skewed fan 17 in an oblique or sideway direction through the holes 8, the hot air is prevented from being discharged to the operator working on the projector.

Thus, a down-sized, low-noise, well ventilated liquid crystal projector 1 (discharging only low-temperature exhaust air) can be realized by implementing the exhaust fans 17 an 18 in exhaust fan configuration in accordance with the embodiment shown.

Further, if there is an unused space inside the case 2 available for the fan 18 after the exhaust fan 17 is obliquely arranged as described above, then the exhaust fan 18 may be also angled in the opposite direction as compared to the fan 17 to maximize mixing of the exhaust air from the two fans.

Figure 19:
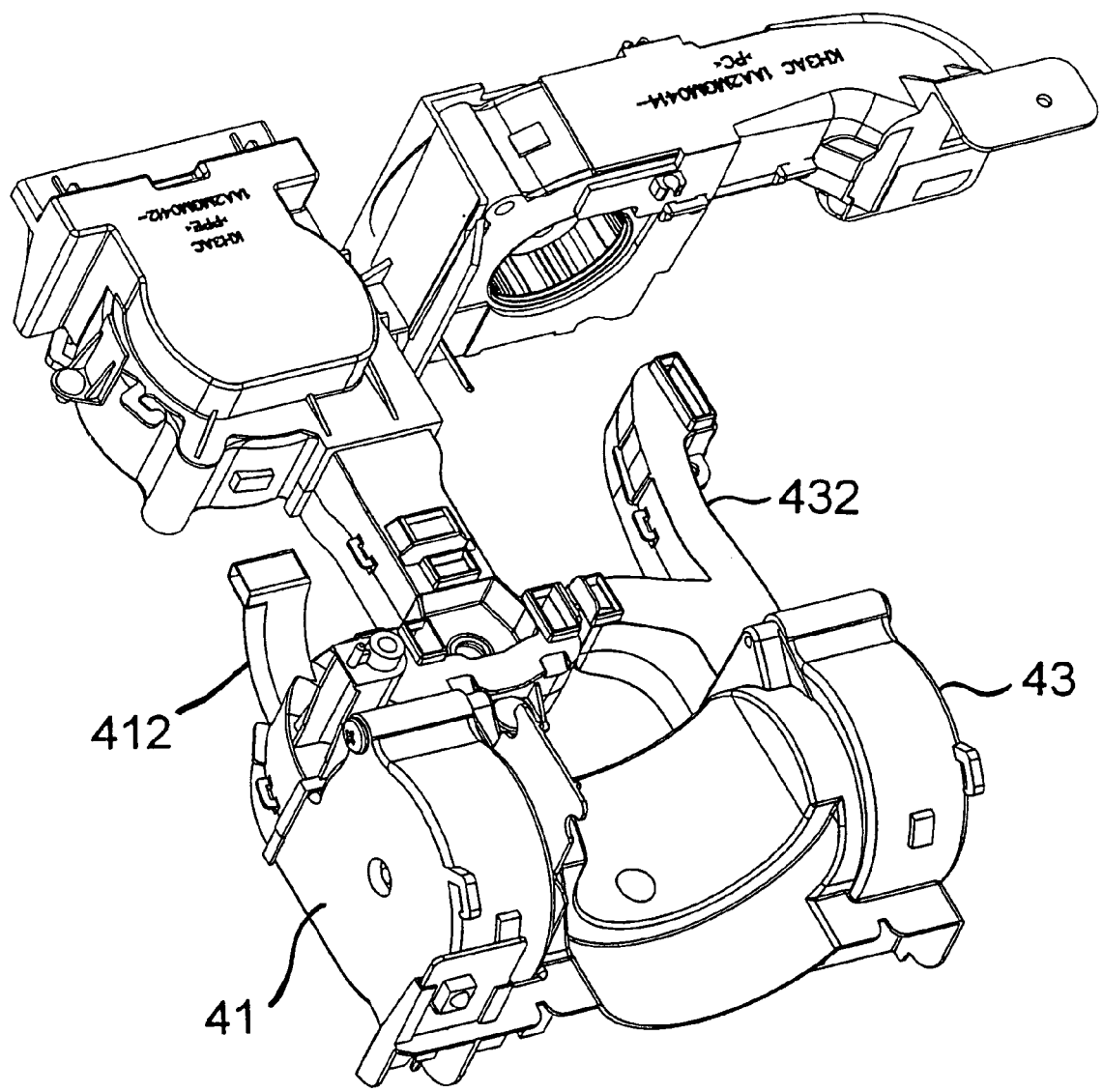
FIGS. 19-21 show an air rectifying structure for cooling an IC installed on a network card, using a fan (41).
Figure 20:
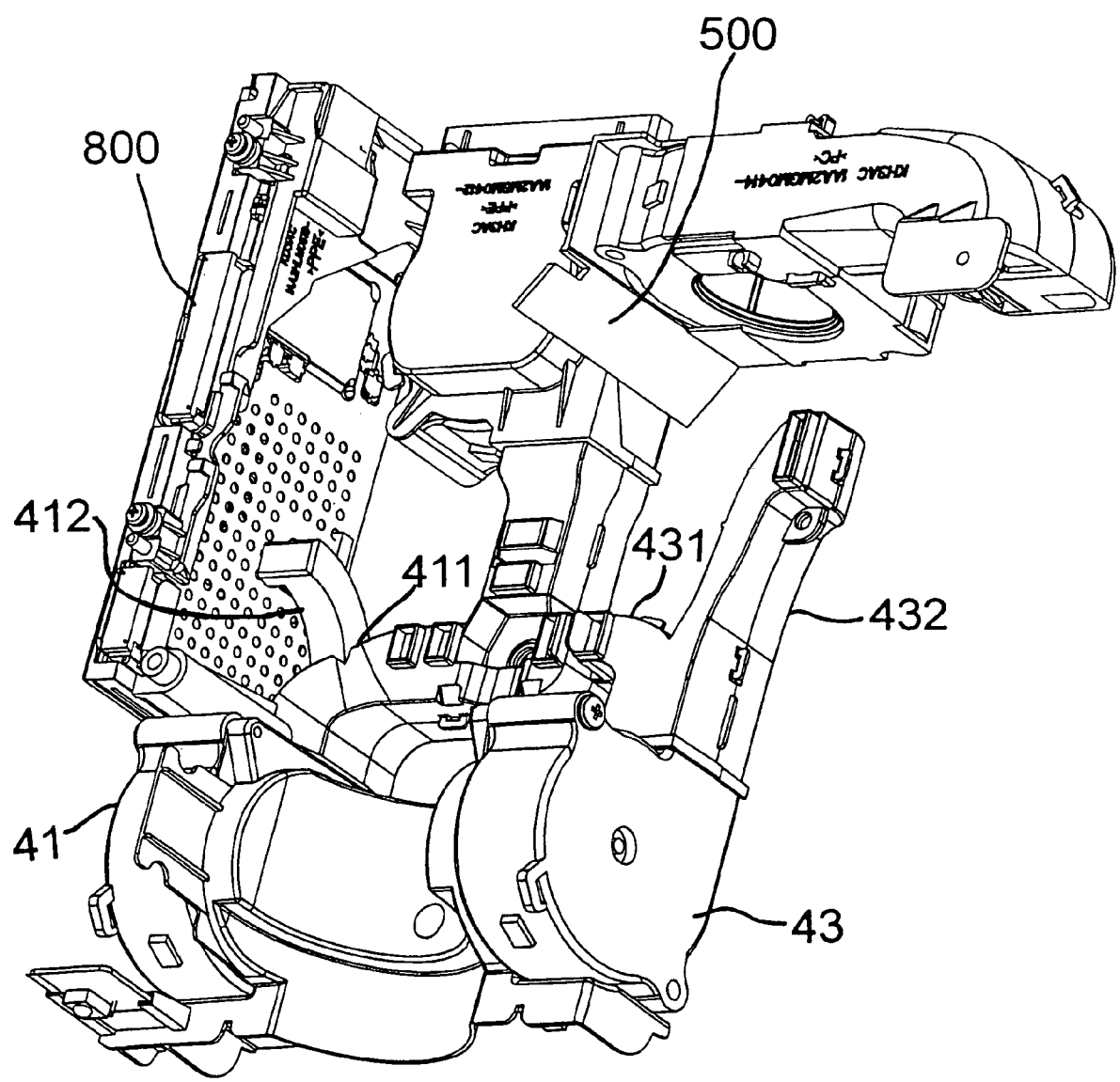
Figure 21:
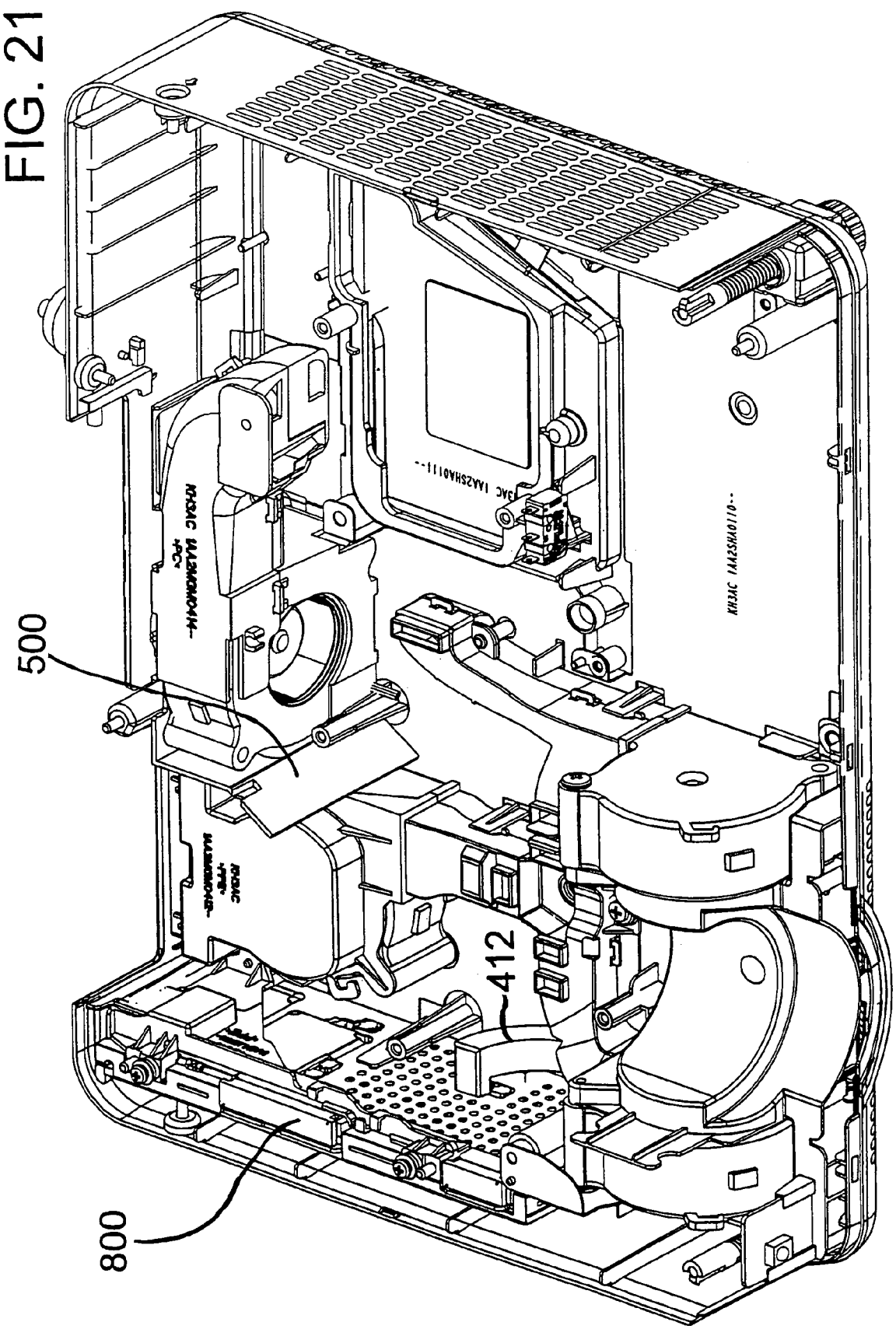
Figure 22:
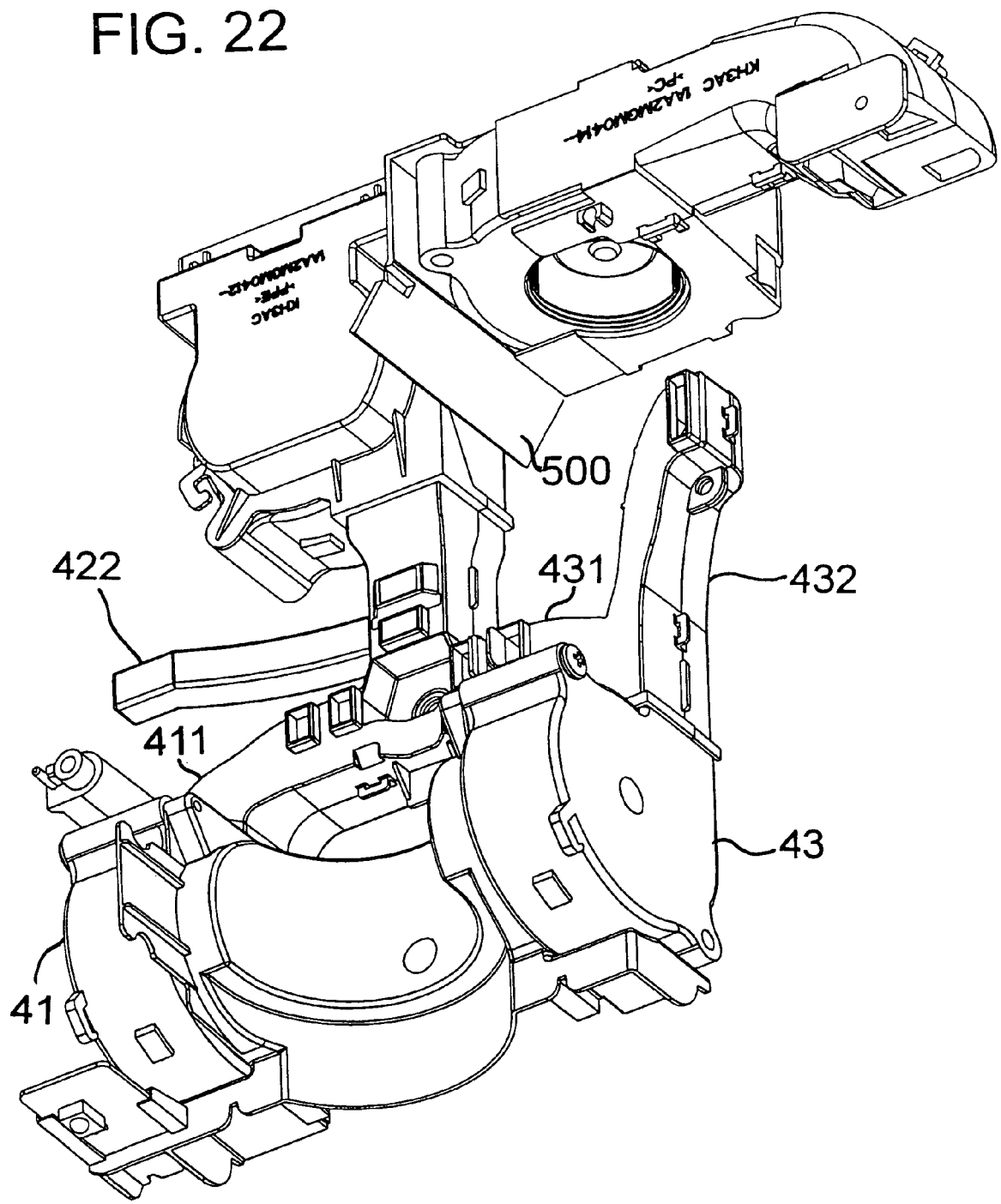
FIGS. 22-24 show another rectifying structure for cooling the IC, using a fan (42).
Figure 23:
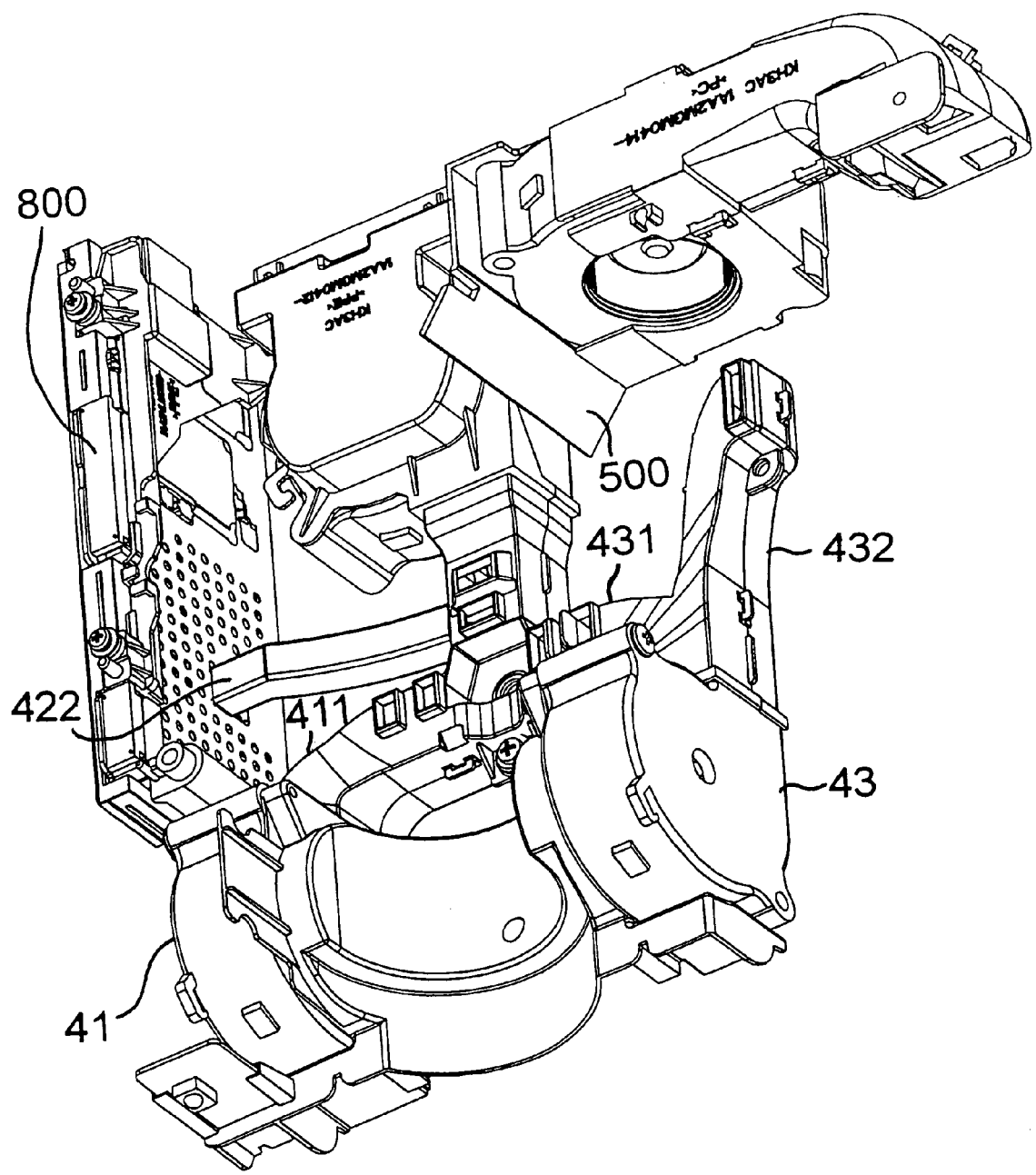
Figure 24:
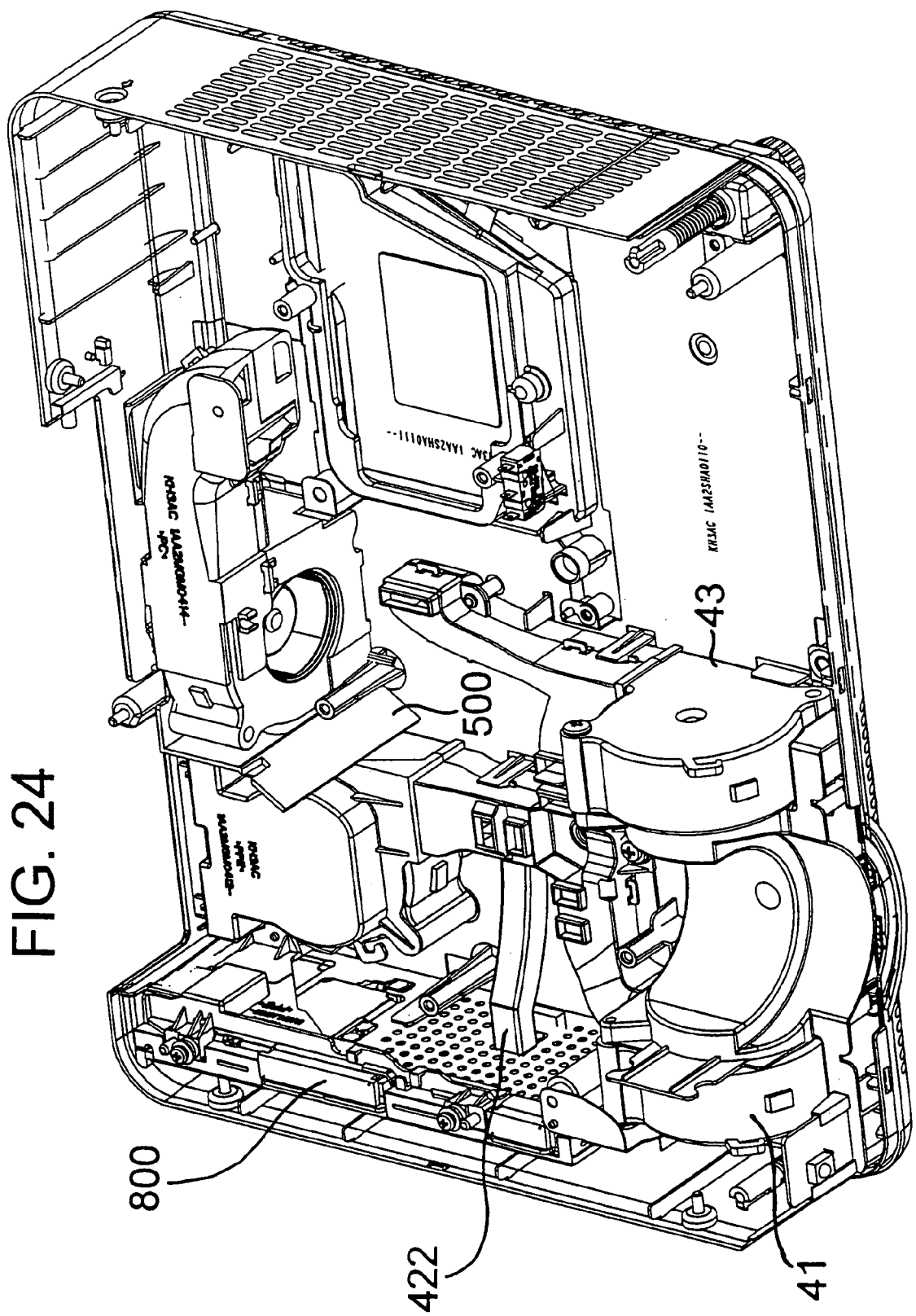

Next, a method of cooling the network card (or LAN card or LAN board) of the projector will now be described. FIGS. 19-21 illustrate an air rectifying structure for use in cooling an integrated circuit (IC) installed on a network card by the fan 41 (first fan). FIGS. 22-24 illustrate another rectifying structure for cooling the IC installed on the network card using a fan 42 (second fan).

A new type of projector can be equipped with a wireless or wired network card (LAN card) 800 as shown in FIG. 20. The card allows fast data transfer to and from an external network. The network card 800 (especially the integrated circuit in the network card) in operation generates heat that must be effectively removed. If not removed, thermorunaway of the network card will incur failure of the network card itself, and hence the projector. Therefore, this thermorunaway problem must be solved.

One way to cool the network card 800 is to re-distribute the volume of the air sent by the fans 41 and 42 to the optical components mounted on the prism such that the optical components as well as the network card are properly cooled. Specifically, it is desirable that the following items are included in this cooling scheme.

As an optimal scheme, the air sent by the fan 41 may be bifurcated to the optical components for blue light (hereinafter referred to as B-optical components) and optical components for red light (hereinafter referred to as R-optical components). To do this, a branching air duct 412 may be connected to the first air duct 411 delivering air to the R-optical components so as to deliver part of the air to the network card 800, thereby appropriately cooling the IC operating at a comparatively high temperature on the network card 800.

Alternatively, a branching air duct 422 for sending air from the fan 42 to the network card 800 may be connected to the second air duct 421 sending air to the optical components for green light (hereinafter referred to as G-optical components), thereby appropriately cooling the.

In this way, using such a cooling scheme as described above, the network card 800 can comply with the thermal requirement without using heat dissipative rubber on the network card 800.

In what follows an exemplary overall arrangement of the cooling ducts will be described in detail. In the case of a high-power compact projector (having for example 0.63-inch LCPs and luminosity of 3000 lumens) as shown in FIG. 15, operating temperatures of the respective optical components are comparatively high, so that it is necessary to provide them with effective cooling. Of the optical components near the prism, the R-optical components can be cooled easier than the G-optical components, while cooling of the B-optical components is most difficult. In order to fulfill required cooling conditions, it is therefore necessary to design proper cooling air ducts for delivering appropriately controlled amount of air to the R-, G-, and B-color components by the three fans.

Since the R-optical components are easiest to cool, the first air duct 411 is preferably configured to deliver the air sent from the fan 41 not only to the R-optical components but also to the R-polarization plate and the B-optical components. The fan 42 is used to cool only the G-polarization plate. The fan 43 collaborates with the fan 41 to cool the B-optical components. The air delivered to the B-optical components is preferably bifurcated to the PBS 23. The configuration of the ducts that provides the most optimal air distribution for cooling all of the three color optical components has been found through experiments conducted by the inventors.

To be specific, the air duct 411 connected at one end thereof with the fan 41 is connected at the other end thereof with the outlet r1 and r2 for sending air to the LCP 34r. The air duct 421 connected at one end thereof with the fan 42 is connected at the other end thereof with the outlets g1 and g2 for sending air to the LCP 34g. The air duct 431 connected at one end thereof with the fan 43 is connected at the other end with the outlet b1 for sending air to the LCP 34b.

The air duct 411 is preferably configured to deliver a portion of the air sent from the fan 41 to the outlet b2. Furthermore, it is preferable to provide the air duct 431 with a further branching air duct 432 that has one end connected with the fan 43 and another end having an outlet p1 for cooling the PBS.

Next, an overall arrangement of the fans for lowering the internal temperature of the projector in accordance with the invention will now be described in detail.

Figure 18:
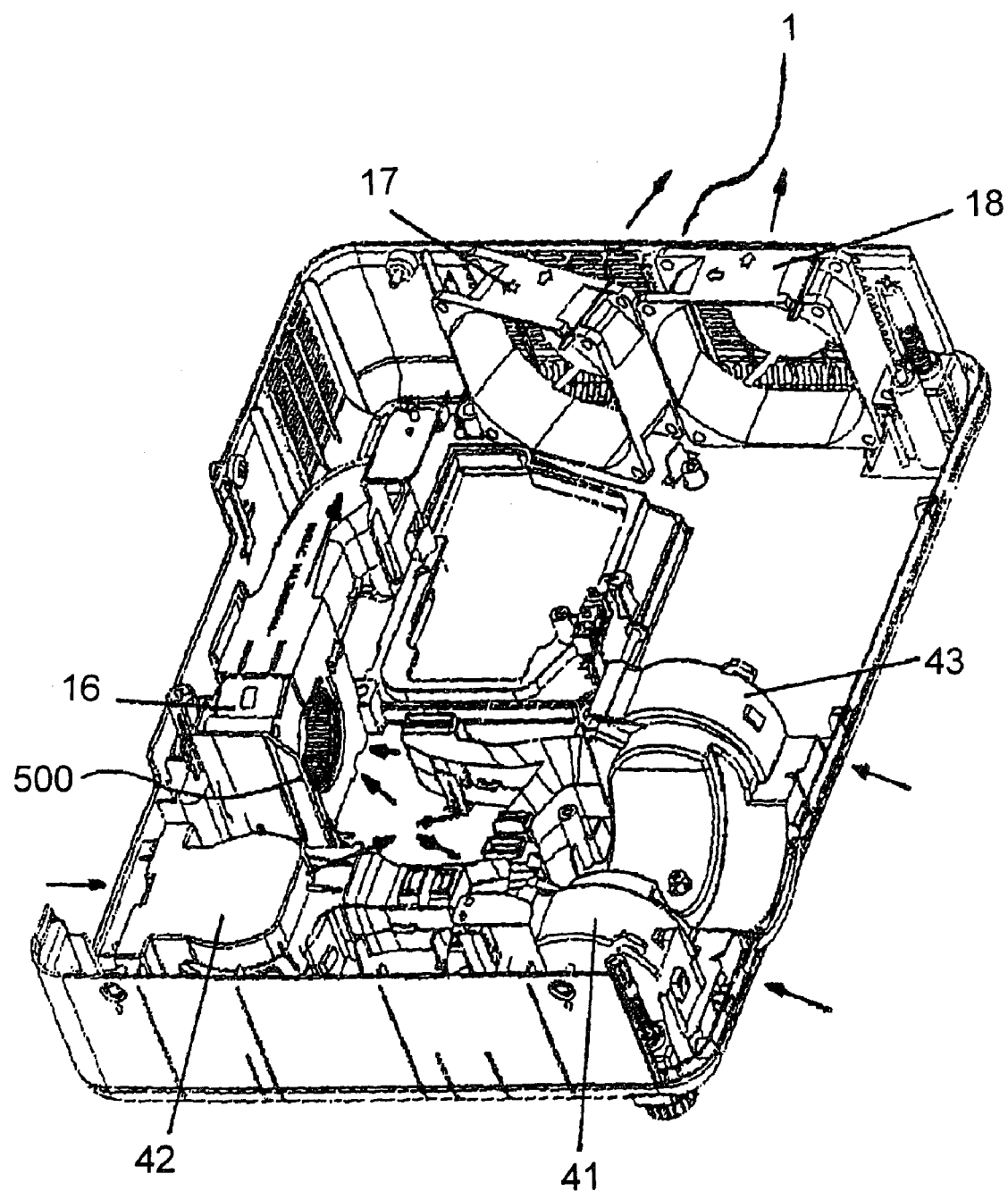
FIG. 18 shows in perspective view an overall arrangement of the fans for lowering the internal temperature of the projector, with arrows showing the flows of the air taken in, and discharged from, the projector by the fans.

Arrows in FIG. 18 show directions of air flowing inside and outside the projector. More particularly, fans 41, 42, and 43 (first, second, and third fans) inspire cold external air into the projector. The cold air is heated as it cools the optical components such as LCPs, staying around the LCPs. However, heat generated by the operating optical components is much less than that of the lamp. Therefore, the temperature of the air is still lower than the temperature of the lamp, and the air can be used to cool the lamp. Thus, it is advantageous to cause the fan 16 (fourth fan) to inspire the air lingering around the optical components such as LCPs and expire the air to the lamp to cool it, as described above. The fan 17 (fifth fan) improves air streams in the projector so that the air heated by the lamp is discharged out of the projector by the fan, thereby lowering the internal temperature of the projector.

Referring again to FIG. 18, there is shown an air rectifying plate 500 mounted on the inspiration face of the fan 16. The air rectifying plate 500 is provided to efficiently guide into the fan 16 the air that has cooled the optical components on the prism and send the air to the lamp to cool it.

In the example shown above, a projection type image display apparatus is shown with reference to a projector that utilizes LCPs as light control elements. It should be understood, however, that the invention can be applied to image projection type image display apparatuses utilizing other types of image forming optical systems. For example, the invention can be applied to a projector utilizing DLP (Digital Light Processing, which is a registered trademark of Texas Instruments (TI), Inc.).

The invention claimed is:

1. A projector having: at least a light source unit; optical components adapted to decompose a beam of source light from said light source unit into beams of three primary colors (red, green, and blue), modulate said three colored beams based on an image signal received, compose said three modulated beams into a beam of full-color imaging light, and project said imaging light; and a power supply unit for supplying electric power to said light source unit and optical components, said projector comprising:
   a first, second, and third fan each provided near said optical components to introduce external air from outside said projector to cool said optical components;
   a fourth, fifth, and sixth fan for discharging internal air of said projector, and wherein:
   said fourth fan adapted to cool said light source unit by blowing into said light source unit the air that has been introduced by said first, second, and third fan and cooled said optical components; and
   said fifth and sixth fans adapted to discharge out of said projector the air that has cooled said light source unit and said power supply unit.

2. The projector according to claim 1, wherein said first through fourth fans are centrifugal fans.

3. The projector according to claim 1, wherein said fifth and sixth fans are axial fans.

4. The projector according to claim 1, wherein said first and third fans are arranged on one side of said optical components, while said second fan is arranged on the other side of said optical components to face said first and third fans across said optical components.

5. The projector according to claim 1, wherein said fifth and sixth fans are arranged on one side of said projector and behind said light source, while said fourth fan is arranged near, and on the other side of, said light source unit to face said fifth and sixth fans across said light source unit.

6. The projector according to claim 1, wherein the amount of the air to be discharged by each of said fifth and sixth fans is at least 3 times as much as the amount of the air taken in by each of said first, second, and third fans.

7. The projector according to claim 1, wherein said fifth fan is adapted to primarily discharge the air that has cooled said light source unit, while said sixth fan is adapted to primarily discharge the air that has cooled said power supply unit.

8. The projector according to claim 1, wherein said fifth and sixth fans are obliquely aligned to each other so that the air streams expired from these fans cross each other.

9. The projector according to any one of claim 1 through 8, further comprising a rectifying plate for guiding air flow, disposed between said second and fourth fans and near said fourth fan.

* * * * *